United States Patent
Lecocq et al.

(10) Patent No.: US 10,339,703 B2
(45) Date of Patent: Jul. 2, 2019

(54) DEVICE AND METHOD TO COMPUTE SHADOW IN A 3D SCENE

(71) Applicant: THOMSON LICENSING, Issy les Moulineaux (FR)

(72) Inventors: Pascal Lecocq, Saint Gregoire (FR); Jean-Eudes Marvie, Betton (FR); Arthur Dufay, Chantepie (FR)

(73) Assignee: Vidon Patents and Strategy, Rennes (FR)

( * ) Notice: Subject to any disclaimer, the term of this patent is extended or adjusted under 35 U.S.C. 154(b) by 724 days.

(21) Appl. No.: 14/938,734

(22) Filed: Nov. 11, 2015

(65) Prior Publication Data

US 2019/0057544 A1    Feb. 21, 2019

(30) Foreign Application Priority Data

Nov. 13, 2014   (EP) .................................... 14306804

(51) Int. Cl.
*G06T 15/06*     (2011.01)
*G06T 15/60*     (2006.01)

(52) U.S. Cl.
CPC .............. *G06T 15/60* (2013.01); *G06T 15/06* (2013.01)

(58) Field of Classification Search
None
See application file for complete search history.

(56) References Cited

U.S. PATENT DOCUMENTS 5,742,749 A    4/1998  Foran et al.
7,119,806 B1  10/2006  Donovan et al.

FOREIGN PATENT DOCUMENTS

KR    2011051315        5/2011
WO    WO2014124870 A1   8/2014
WO    WO2014124871 A2   8/2014

OTHER PUBLICATIONS

Lloyd et al. "Logarithmic Perspective Shadow Maps" ACM, 2008. (Year: 2008).*
Berthold Horn, "Obtaining Shape From Shading Information", 1989. (Year: 1989).*
Robert T. Frankot, "A Method for Enforcing Integrability in Shape from Shading Algorithms", IEEE, 1988. (Year: 1988).*
Lauterbasch et al: "Fast hard and soft shadow generation"; UNC CS technical report TR09-0004, Jan. 2009; pp. 1-9.

(Continued)

*Primary Examiner* — Nicholas R Wilson
(74) *Attorney, Agent, or Firm* — Myers Wolin LLC

(57) ABSTRACT

Shadow is computed in a lighted 3D scene, based on a depth map. For each depth map element, following geometric information is stored: depth value, coordinates of vertices and local depth variation of a surface element. Also, ray intersection is tested for a pixel with the surface element having depth computed from the depth and local depth variation, taking into account the coordinates of vertices. A minimum depth associated with the surface element is further computed from the geometric information, with which the depth of a pixel is compared. The pixel is classified as lit if the depth is lower than the minimum depth, and as shadowed if the depth is greater and if a ray intersection is found for the pixel with the surface element from the ray intersection testing. The invention can provide a fast solution for high-quality shadow.

23 Claims, 8 Drawing Sheets

(56) References Cited

OTHER PUBLICATIONS

Olsson et al: "Improved Ray Hierarchy Alias Free Shadows"; Technical report 2011; pp. 1-14.
Hertel et al: "A hybrid GPU rendering pipeline for alias-free hard shadows"; Eurographics 2009; pp. 1-8.
Eisemann et al: "Real-Time Shadows"; Chapter 1;Book-A K Peters-CRC Press-2011; pp. 1-11.
Hasselgren et al: "Conservative Rasterization"; GPU Gems, 2005, pp. 677-690, vol. 2.
Search Report dated April 28, 2015.

* cited by examiner

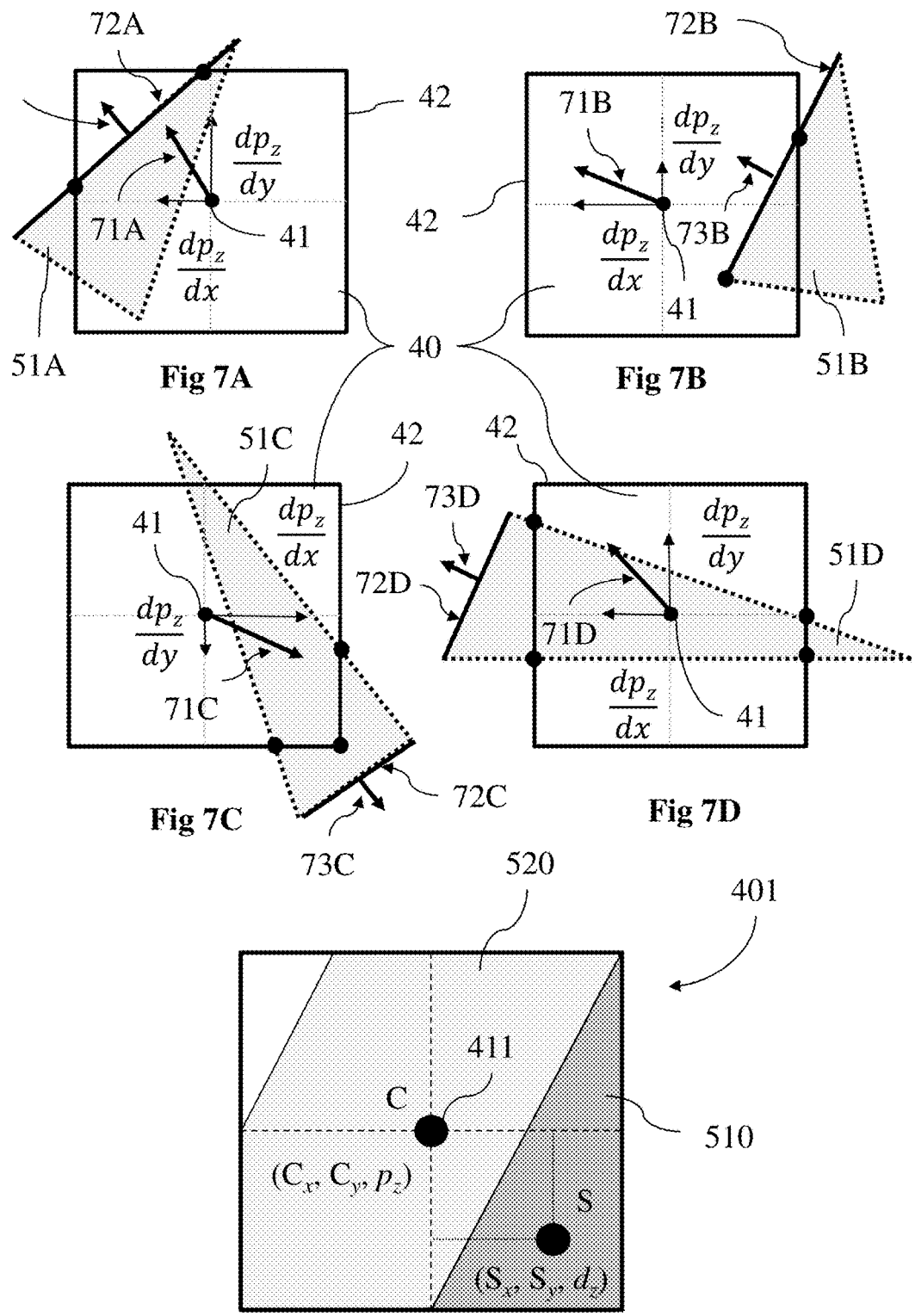

DEVICE AND METHOD TO COMPUTE SHADOW IN A 3D SCENE

1. TECHNICAL FIELD

The invention relates to the domain of image rendering in the representation of three-dimensional scenes, and concerns more especially shadow computing. It pertains to Computer Generated Image (CGI or 3D-CGI), notably for games and VFX (Visual Effects) pre-visualisation and VFX production.

2. BACKGROUND ART

The rendering of high-quality shadows in a 3D scene is currently achieved by using ray-tracing techniques, which allow precise visibility tests between light sources and surfaces. Those tests consist in casting a ray towards light sources and determine whether or not it intersects an element of the scene. If an intersection is found, the point is considered in shadow.

The main issue with those techniques is their computing costs, all the more since computing such intersections for every pixel of the scene can become prohibitive even when using optimized GPU (Graphics Processing Unit) ray tracing engine and dedicated spatial acceleration data structures. In order to overcome this drawback while endeavouring to preserve good quality outputs, significant work dedicated to real time rendering techniques for shadows has been done.

In particular, several techniques for hybrid rendering of shadows have been developed. Such techniques are hybrid in that they are relying partly on ray-tracing, and partly on other approaches less costly in time processing, usually relying on GPU rasterization. This includes notably local intersection tests.

Such a solution has been described by S. Hertel, K. Hormann and R. Westermann in "A hybrid GPU rendering pipeline for alias-free hard shadows", D. Ebert and J. Krüger, editors, *Eurographics* 2009 *Areas Papers*, pages 59-66, München, Germany, March/April 2009, Eurographics Association. They combine the rasterization of a shadow map with a GPU ray-tracer to accelerate the rendering of ray-traced shadows, by using conservative rasterization of the shadow map. Building a shadow map using conservative triangle rasterization means that a triangle is rasterized into each shadow map pixel or texel that is at least partly covered by that triangle's light space projection.

Also, the shadow map is used for storing a depth value, a triangle ID (identifier) and a flag indicating whether the triangle fully covers or not the considered texel. The depth value is obtained through a slope scale depth correction, by shifting the triangle towards the light source so that the depth value associated with the texel center corresponds to a minimum value found in the texel area crossed by the triangle plane. By using a simple depth test and by checking the triangle coverage flag, they are then able to quickly classify pixels that are lit or shadowed. For remaining unclassified view samples, they further perform an intersection test against the rasterized triangle by retrieving its coordinates through its ID. For still remaining pixels, classified as uncertain, they cast shadow rays using a GPU ray-tracer to solve their lit status.

That method suffers however some following drawbacks. First, it requires triangle indexing of the scene and storage of the triangles in a geometry buffer. If vertices are animated, this buffer needs to be updated and may introduce some computational overhead. Moreover, many different triangle IDs may be stored locally in a shadow map, especially in presence of unorganized geometry (trees or leaves, for instance). Storing such unorganized triangle IDs leads to scattered memory accesses that have proved to be inefficient on GPU architecture. This is suspected to be the bottleneck of their method, since the reported speed-up does not show so much improvement in rendering times. Namely, best reported speed up amounts to a factor of around 1.46 over a full ray-tracing solution. In addition, the use of the triangle coverage flag is prone to errors for inclined surfaces. Finally, that technique performs excessive ray-tracing computations in areas lying in shadow edges. Computational overhead becomes even prohibitive in presence of models with geometry density similar or slightly greater than the shadow map resolution.

Another hybrid method has been proposed by C. Lauterbach, Q. Mo and D. Manocha in "Fast Hard and Soft Shadow Generation on Complex Models using Selective Ray Tracing", *UNC CS Technical Report TR*09-004, January 2009. They use also a conservative shadow map to accelerate shadow ray-tracing computations, and further propose to analyze depth for the eight surrounding texels around a considered sample so as to detect the presence of shadow edges. This is done by comparing the maximum absolute depth difference with the minimum depth variation determined by a far and near plane. Depending on a surface inclination with respect to the light source, they determine pixels that need to be ray-traced or not.

A drawback of this method is that it fails in detecting small holes in geometry due to the finite resolution of shadow map and the lack of geometric information. Moreover, it is sensitive to shadow map bias.

More recently, other technologies enabling to enhance depth map computing have been disclosed in WO 2014/124870 A1 and WO 2014/124871 A2 to Thomson Licensing (both having as inventors P. Lecocq, P. Gautron and J.-E. Marvie) published on Aug. 21, 2014. In this purpose, as usually practiced, a distance between a point of view (which can correspond to a light source) and a fragment of scene is compared with depth information associated with an element of the depth map or shadow map corresponding to a projection of that fragment into the depth map. However, the depth information is not only retrieved from merely depth data associated with the center of the element, but results also from information representing the variation of depth inside the element. This can result in more precise rendering, by correcting some defects related to the finite resolution of the depth map. Various ways for obtaining relevant variation of depth are further described. Also, it is detailed (in WO 2014/124870 A1) how to establish the frontier between objects of a scene in a depth map, using vertices of surface elements stored in depth map elements.

Though those technologies provide quite useful tools in shadow computing, it is anyway desirable to still improve computing efficiency without being prejudicial to rendering precision.

3. SUMMARY

The purpose of the present disclosure is to overcome the disadvantages of the prior art, by offering potentially increased computing efficiency with maintained good-level rendering precision.

An object of the present disclosure is notably a hybrid rendering of shadows possibly enabling to overcome the above-mentioned drawbacks.

Such a technology can potentially provide, in its best embodiments, a fast and precise solution, which does not introduce any artefact and achieves real-time performances in complex scenes at quality close to full ray-tracing methods.

In this respect, the present disclosure relates to a graphics processing device configured to compute shadow in a three-dimensional scene lighted by at least one light source, based on at least one depth map comprising a plurality of elements, that depth map being associated with a two-dimensional bounded space adapted to render an image of the scene according to a point of view of the light source(s).

The graphics processing device comprises at least one processor configured for:
- storing information representative of a depth consisting in the distance between the point of view and a closest visible surface from the point of view for each of the depth map elements;
- storing in each element of at least part of the depth map, coordinates of vertices of at least one surface element of the closest visible surface, the coordinates being expressed in the space of the depth map;
- storing in each element of that part of the depth map (i.e. the whole depth map or a part thereof), information representative of local depth variation of the surface element(s) in the space of the depth map;
- testing ray intersection in that part of the depth map for at least one pixel of the image, with the surface element(s) having depth computed for that pixel from the information representative of depth and of local depth variation, taking into account the coordinates of vertices.

According to the present disclosure, the processor(s) is/are further configured to:
- compute at least one minimum depth associated with the surface element(s) for each element of that part of the depth map, the minimum depth being computed from the coordinates of vertices and the information representative of depth and of local depth variation;
- compare depth associated with at least one pixel of the image, located in the depth map element, with the minimum depth associated with the depth map element and with the surface element(s);
- classify that pixel as lit if the depth associated with the pixel is lower than the minimum depth;
- classify that pixel as shadowed if the depth associated with the pixel is greater than the minimum depth, and if a ray intersection is found for that pixel with the surface element(s) from the ray intersection testing.

The graphics processing device of the present disclosure is to be understood preferably as an apparatus, or a physical part of an apparatus, designed, configured and/or adapted for performing the mentioned functions and produce the mentioned effects or results. In alternative implementations, however, it is embodied as a set of apparatus or physical parts of apparatus, whether grouped in a same machine or in different, possibly remote, machines. In the latter case, the graphics processing device of the present disclosure amounts to a system.

According to particular characteristics, the graphics processing device of the present disclosure includes one or several GPUs, which comprise the processor(s) of the device. In other implementations, the device is made of one or several circuits inside a GPU. In alternative embodiments, the device is configured for cooperating with GPUs.

The terms "adapted" and "configured" are further used in the definition of the present disclosure as broadly encompassing initial configuration, later adaptation or complementation of the device, or any combination thereof alike, whether effected through material or software means (including firmware).

For sake of clarity, an element of the 3D scene is called a fragment or a point when positioning in the space of the scene (the world space), while the same element visible from the point of view associated with the depth map is called pixel when positioning in the space of the depth map. A point (fragment) visible from the point of view (light source) associated with the depth map and the corresponding pixel in the depth map refer thus to one and a same element of the scene and may mixed up in some parts of the description.

Also, the depth map is preferably formed as an array of texels—or 3D textures, which correspond respectively to the depth map elements. Those texels are then used for storing the data on the associated surface elements. For example, each texel of an RGBA shadow map (RGBA standing for Red Green Blue Alpha) is used for storing the 2D coordinates of a corresponding projected triangle, the associated depth at texel center and the partial derivatives in shadow map space.

The encoding of the surface elements into the depth map elements (e.g. RGBA encoding of triangles in texels), as well as the computation of the minimum depth and the subsequent pixel classification, are advantageously carried out by a fragment shader of a GPU rendering pipeline. Alternatively, this is effected in a computing kernel in image space using a G-buffer (Geometry buffer), such as with computing platforms involving OpenCL (Open Computing Language), CUDA or an OpenGL or Direct3D Compute Shader (shader stage that is used for computing arbitrary information).

A possibly efficient lit/shadowed classification is offered by the present device, relying notably on preliminary depth comparison with a reference value, consisting in a previously computed minimum depth for the considered depth map element. The knowledge of that minimum depth is based on information pertaining to vertices coordinates and local depth variation stored in that element, the latter being preferably obtained by means of the solutions disclosed in WO 2014/124870 A1 and WO 2014/124871 A2 to Thomson Licensing.

Accordingly, the information on local depth variation is advantageously established (i.e. computed or generated) by a GPU during the rasterization process of the considered surface element(s).

Also, the information representative of the variation of depth in the considered depth map element, for a given surface element, is preferably established from depth information associated with the centers of depth map elements neighboring the considered depth map element.

In a specific embodiment, notably, the information representative of the variation of depth for the considered depth map element along an axis is established from the depth information associated with the center of that element and with the center of another element advantageously adjacent to that element along that axis, by taking into account the distance separating the centers of those depth map elements along that axis. Also, the depth information is preferably obtained for the two axes x and y corresponding to the space (x, y) of the depth map.

In another specific embodiment, the information representative of the variation of depth pertaining to a given surface element (represented in the world space, i.e. the space of the scene) is obtained by projecting that surface element into a tridimensional space of an orthographic camera associated with the depth map. This provides a function representative of the plane associated with the surface element in the 3D space (x, y, z) of the orthographic camera, and consequently the information representative of the variation of depth z along the x axis and/or the y axis.

In addition, in particular implementations regarding the storing of the information representative of the variation of depth, the latter are fully or partly expressed under the form of slope angles, which are advantageously encoded in odd power functions (e.g. $x^3$ or $x^5$). This can enable to keep a good accuracy with limited depth map storage, though the variations of depth tend to be significantly small in presence of front facing surfaces (i.e. surfaces of object(s) having a normal parallel or roughly parallel with the viewing direction passing through the center of the depth map element) and conversely very large in presence of grazing angle surfaces (i.e. surfaces of object(s) of the scene having a normal perpendicular or roughly perpendicular to the normal of the depth map). That result is due to the fact that the angular domain around 0 is thereby compressed and that higher precision for area near the domain bounds $$\left(\text{namely near} -\frac{\pi}{2} \text{ and } \frac{\pi}{2}\right)$$

is given.

For example, a good precision can possibly be obtained with an only 8 bits data storage for each value pertaining to the variation of depth—such as a derivative along the x or y axis. Decoding is then advantageously performed for decoding the information values in scene rendering pass, where depth comparisons take place as to determine whether fragments are lit.

More details are available to the skilled person in patent applications WO 2014/124870 A1 and WO 2014/124871 A2 for obtaining and storing the information representative of the variation of depth, in which the skilled person will find appropriate teaching for implementing the present device in advantageous ways.

The present disclosure contrasts notably with the teaching of those publications in that instead of computing repeatedly the depth information taking into account the variation of depth for each processed fragment, the computed minimum depth is available for the whole depth map element. It further enables to take the boundaries of the surface elements into account without requiring the establishment of frontiers between objects as described in WO 2014/124870 A1. Those differences can potentially lead to significant processing gains, without jeopardizing in any way the accuracy of the outputs.

Exploiting such a reference minimum value, stored for multiple subsequent exploitation, instead of proceeding with a number of computations depending notably on the positioning of fragments projected on the depth map, constitutes a surprising and fruitful change of paradigm. In addition, the present device in appropriate implementations appears to avoid or significantly reduce scattered random accesses into GPU memory. This can be due notably to explicitly storing the entire definition of the surface elements in the depth map elements—including the coordinates of vertices as well as depth and local depth variation. Notably, shadow ray intersection can be performed directly against surface elements available for the depth map elements—e.g. triangles stored in texels. This enables to access information on a surface element through a single texture fetch, instead of deferred random accesses using surface element IDs.

Preferably, the information representative of a depth for a surface element is computed at the center of the considered depth map element. Also, the minimum depth computed notably from the coordinates of vertices corresponds preferably to the effective minimum value reached by the depth for the considered surface element over the depth map element. This contrasts with some prior art solutions, in particular such as described by Hertel et al. in 2009's publication cited above, obtaining the minimum depth from extrapolating the depth value for the surface element at the sides of the depth map element, without consideration of the vertices of the surface element.

The graphics processing device of the present disclosure further makes possible easy implementation on graphics hardware and/or on production renderers.

Other potential advantages, obtained separately or in combination in specially relevant implementations, include:
  high quality shadows rendering at real time or interactive frame rate;
  removal or reduction of artefact;
  fast processing;
  compatibility with usual ray-tracing or deferred rendering pipelines;
  easy implementation on graphics hardware;
  easy implementation on production renderers.

Preferably, the processor(s) is/are further configured to classify the pixel as uncertain if that pixel is not classified as lit and is not classified as shadowed, and to trace a ray having as origin a scene fragment of the three-dimensional scene corresponding to that pixel toward said point of view as to determine whether said pixel is lit.

This amounts to a hybrid rendering method, which can possibly, in best embodiments, take advantage of efficient GPU rasterization engines combined with GPU ray tracing techniques for drastically accelerate rendering times of ray-traced shadows. Indeed, ray-tracing computations can then be limited to a small subset of pixels, which reduces ray-tracing operations over previous hybrid solutions.

In advantageous implementations, the processor(s) is/are further exploiting spatial acceleration structure for ray tracing, leading to grouping objects of the 3D scene according to a spatial acceleration scheme with hierarchization. That spatial acceleration advantageously relies on BVH (Bounding Volume Hierarchy), LBVH (Linear BVH), BSP trees (Binary Space Partitioning)—notably k-d trees—or Octrees structures. Such structures map very well on GPU memory with good locality of data.

In addition with such ray tracing implementation, the processor(s) is/are further preferably configured for tracing the ray only up to a distance to the point of view corresponding to the minimum depth associated with the depth map element in which that pixel is located.

This reduces all the more the computation load needed, through reducing the few needed ray tracing operations to limited ray traversal distances.

Preferably, the considered depth map element in which the pixel is located having neighbor depth map elements belonging to the part of the depth map, the processor(s) is/are further configured to compute the minimum depth for the considered depth map element also from the coordinates of vertices and the information representative of depth and of local depth variation stored in the neighbor depth map elements for the surface element(s) associated with the neighbor depth map elements.

That extension can enable still increased rendering accuracy, especially in presence of small or thin surface elements. Indeed, surface elements stored in the vicinity of the considered depth map element but overlapping the latter can thereby be taken into account in the filtering based on the minimum depth.

Taking into account the surface elements associated with neighbor depth map elements for the computation of the minimum depth can be implicit through conservative rasterization, as specified below.

In advantageous embodiments, if the depth associated with the pixel is greater than the minimum depth for the depth map element and if the pixel is not classified as lit and is not classified as shadowed, the processor(s) is/are further configured:

for additionally testing ray intersection for the pixel with at least one other surface element, associated with the neighbor depth map elements, having depth computed in that considered depth map element from the information representative of depth and of local depth variation stored in the neighbor depth map elements, taking into account the coordinates of vertices stored in the neighbor depth map elements;

for classifying the pixel as shadowed if a ray intersection is found for that pixel with the other surface element(s) from that additional ray intersection testing.

In a specific implementation, for at least one of the considered depth map elements, the neighbor depth map elements consist in eight neighbor depth map elements surrounding the considered depth map element(s).

This amounts to focusing on the immediate vicinity of the considered depth map element—of course, some of the depth map elements may have less than eight neighbors, which happens when they are located at the border of the depth map.

Though the embodiments above involve additional computation costs with respect to involving uniquely the geometric information stored in the considered depth map, it can still potentially improve significantly the rendering precision, by integrating the consideration of the neighbor depth map elements in the ray intersection tests. In addition, when combined with a hybrid method involving ray tracing in case of uncertain pixels, this can contribute to further decreasing significantly the computation costs. Indeed, a number of potentially uncertain pixels without that solution can then be classified as shadowed. In this respect, a highly desirable combination of very good accuracy and reduced computation costs can thereby be achieved.

Preferably, after having determined that the depth associated with the pixel is greater than the minimum depth for the considered depth map element (so that the pixel is not considered as lit), the ray intersection test is first carried out with the surface element associated with that depth map element. Only if no intersection is identified, so that the pixel is not classified as shadowed, the ray intersection test is subsequently carried out also for the neighbor depth map elements. In case no intersection is then identified, the pixel is classified as uncertain and the shadow status is decided by means of ray tracing.

The minimum depth stored for a given depth map element does not necessarily correspond to the same surface element as the stored information representative of a depth. Indeed, in advantageous embodiments: the depth information is determined from the surface element having depth computed at the center of the depth map element; while the minimum depth corresponds to the surface element having the smallest value over the entire depth map element.

Preferably, each of the depth map elements having a center, the processor(s) is/are further configured for:

proceeding with a preliminary expansion of the surface element(s) to at least one respectively expanded surface element in determining the depth map element(s) associated with the surface element(s);

determining for each of the depth map element(s), the expanded surface element(s) covering the center of that depth map element;

selecting among the expanded surface element(s) covering the center of that depth map element, the expanded surface element having the smallest depth at that center;

for that depth map element belonging to that part of the depth map, storing the coordinates of vertices and the information representative of depth and of local depth variation associated with the selected surface element into that depth map element.

That process corresponds to a particular kind of conservative rasterization relying on the above features specific to the present disclosure. Conservative rasterization is particularly useful for considering surface elements, such as e.g. triangles, having a size that is less than a depth map element. They may represent thin geometry structures such as tree branches, but also surface elements viewed from grazing angles, which are very important to be considered as they are responsible for the shadow silhouette. Principles and particular implementations of conservative rasterization have been described and discussed notably in above cited reference by Hertel et al. dated 2009 and in a publication by J. Hasselgren, T. Akenine-Möller and L. Ohlsson, "Conservative rasterization", in the book *GPU Gems* 2, 2005, pages 677-690. A person skilled in the art will thus be aware of multiple different and efficient ways of implementing conservative rasterization with the present device.

The expansion of the surface elements is preferably such that any surface element projected at least partly into the depth map element, even though not covering the center of that depth map element, is fully taken into account. Conversely, that expansion is preferably limited so as to avoid associating surface elements with depth map elements into which they are not projected. The expansion can be determined in different ways, as known to a person skilled in the art. Especially, the edges of the expanded surface elements are advantageously moved toward their normal direction, for example by a length equal to 0.5 time the width of a depth map element.

Conservative rasterization enables to extend the coverage of the surface elements to depth map elements that would have not been considered otherwise, due to having centers not covered by those surface elements.

More specifically in the frame of the present disclosure, conservative rasterization is preferably combined with the recording of the relevant geometric information (coordinates of vertices and information on depth and local depth variation), which pertains to the surface element having the smallest depth at the center of the considered depth map element. Of course, when a unique such surface element stands, the related selection amounts to merely recording the latter. The depth at the center of the depth map element, when the surface element does not cover it, is preferably estimated from linear interpolation based on depth variations within that surface element.

The combined processing above proves particularly efficient. Indeed, it enables to store upstream in the depth map elements, consistent and most relevant geometric data. This is notably in line with the advantageous storing of the minimum depth, taking the vicinity of the considered depth map element into account. Also, selecting the surface element to be stored in function of the depth at the center of the depth map element is consistent with the usual practice.

It deserves noting, however, that insofar as the neighbor depth map elements are taken into account, conservative rasterization does not necessarily leads to selecting the same surface element for the information representative of a depth as for the minimum depth. Indeed, the surface element having the smallest depth value at the center of the considered depth map element may differ from the surface element having the minimum depth value over the whole depth map element. This may lead to some view samples having a depth superior to the stored minimum depth, but inferior to the smallest depth value reached for the surface element within the depth map element. Such view samples are accordingly classified as uncertain, unless involving an intersection with another surface element than the one stored in the depth map element, as mentioned above for advantageous embodiments.

In an alternative implementation, conservative rasterization is combined with the recording of the relevant geometric information (coordinates of vertices and information on depth and local depth variation), which pertains to the surface element having the smallest depth over the whole depth map element. This implementation decreases the number of uncertain pixels. Indeed, it is consistent with the stored minimum depth value, since corresponding to the same surface element, and avoids the existence of view samples for which the depth is inferior to the minimum depth value but superior to the smallest depth value over the considered depth map element for the stored surface element. It requires however some specific adaptations with respect to existing systems.

Conservative rasterization of the depth map for shadow computing can further allow rapid classification of lit area. In appropriate implementations, it can guarantee that the depth of closest visible surface element is written whatever the coverage of that surface element inside a depth map element. Accordingly, if the depth of a view sample projected in light space is less than, or equal to, the minimum depth stored in the depth map element, it can then ensure that the corresponding pixel is fully lit.

Computing the conservative expansion of the surface elements is preferably carried out at the stage of a geometry shader in a GPU rendering pipeline.

The way of determining the minimum depth will now be presented. Preferably, the processor(s) is/are further configured for computing the minimum depth(s) at at least one point of that depth map element and of the projection in the space of the depth map of the surface element(s), called a closest point. That closest point is determined by means of a gradient of decreasing depth variation in the space of the depth map for the surface element, given by the information representative of local depth variation.

More specifically, the depth map element having sides and corners in the space of the depth map and the surface element having edges expressed in the space of the depth map, the closest point is advantageously determined by:
  identifying by means of that gradient, among the edges of the surface element, a closest edge having the smallest depth;
  performing intersections between the closest edge and the sides of the depth map element;
  determining the minimum depth of that closest point in function of those intersections.

Still more precisely, in particular implementations, the vertices of the surface element being expressed in the space of the depth map, the processor(s) is/are configured for determining the minimum depth:
  if two intersection points are found between the closest edge and the sides of the depth map element, by selecting the smaller depth of those intersection points;
  if one intersection point is found between the closest edge and the sides of the depth map element, by selecting the smaller depth of the vertex of the closest edge inside the depth map element and of that intersection point;
  if no intersection is found between the closest edge and the sides of the depth map element, by performing intersections between the other edges of the surface element than the closest edge and the sides of the depth map element.

Going a step further, in a still more specific implementation, the processor(s) is/are configured for determining the minimum depth if no intersection is found between the closest edge and the sides of the depth map element:
  if one intersection point is found between each of the other edges and respective adjacent sides of the depth map element pointed by the gradient, by using the depth at the corner between those adjacent sides;
  otherwise, if two intersection points are found between the other edges and the sides of the depth map element, by selecting the smallest depth of those intersection points and the vertex of the surface element inside the depth map element, and if four intersection points are found between the other edges and the sides of the depth map element, by selecting the smallest depth of those intersection points;
  if no intersection is found between the other edges and the sides of the depth map element, by using the depth at the side of the depth map element having the minimum depth.

The present disclosure also pertains to a method for graphics processing adapted to compute shadow in a three-dimensional scene lighted by at least one light source, based on at least one depth map comprising a plurality of elements, that depth map being associated with a two-dimensional bounded space adapted to render an image of the scene according to a point of view of the light source.

The graphics processing method comprising:
  storing information representative of a depth consisting in the distance between that point of view and a closest visible surface from the point of view for each of the depth map elements;
  storing in each element of at least part of the depth map, coordinates of vertices of at least one surface element of the closest visible surface, the coordinates being expressed in the space of the depth map;
  storing in each element of that part of the depth map, information representative of local depth variation of the surface element(s) in the space of the depth map;
  testing ray intersection in that part of the depth map for at least one pixel of the image, with the surface element(s) having depth computed for that pixel from the information representative of depth and of local depth variation, taking into account the coordinates of vertices.

According to the present disclosure, the method for graphics processing further includes:
  computing at least one minimum depth associated with the surface element(s) for each element of that part of the depth map, the minimum depth being computed from the coordinates of vertices and the information representative of depth and local depth variation;

comparing depth associated with at least one pixel of the image, located in the depth map element, with the minimum depth associated with the depth map element and with the surface element(s);

classifying that pixel as lit if the depth associated with the pixel is lower than the minimum depth;

classifying the pixel as shadowed if the depth associated with the pixel is greater than the minimum depth, and if a ray intersection is found for the pixel with the surface element(s) from the ray intersection testing.

That method for graphics processing is preferably executed by means of a graphics processing device according to the present disclosure.

In addition, the present disclosure concerns a computer program for graphics processing, comprising software code adapted to compute shadow according to a method compliant with the present disclosure.

This computer program can have any form, and notably be embedded in a graphics processing device or a GPU according to the present disclosure. In alternative embodiments, it is available separately from an apparatus, and configured to be implemented within that apparatus so as to allow the execution of the process for graphics processing compliant with the present disclosure. This can be done either via a tangible support carrying the computer program or via local or remote downloading. In particular, the computer program can be available as flashing firmware, enabling to update a graphics processing apparatus.

In still other embodiments, the computer program is configured to be exploited in combination with an apparatus for 3D rendering, but remotely, notably through online operations.

The present disclosure further pertains to a non-transitory program storage device, readable by a computer, tangibly embodying a program of instructions executable by the computer to perform a process for graphics processing compliant with the present disclosure.

Such a non-transitory program storage device can be, without limitation, an electronic, magnetic, optical, electromagnetic, infrared, or semiconductor device, or any suitable combination of the foregoing. It is to be appreciated that the following, while providing more specific examples, is merely an illustrative and not exhaustive listing as readily appreciated by one of ordinary skill in the art: a portable computer diskette, a hard disk, a ROM (read-only memory), an EPROM (Erasable Programmable ROM) or a Flash memory, a portable CD-ROM (Compact-Disc ROM).

4. LIST OF FIGURES

The present disclosure will be better understood, and other specific features and advantages will emerge upon reading the following description of particular and non-restrictive illustrative embodiments, the description making reference to the annexed drawings wherein:

FIG. 1 diagrammatically shows a graphics processing apparatus comprising the features of a graphics processing device according to the present disclosure;

FIGS. 7A, 7B, 7C and 7D represent four illustrative cases of positioning of a triangle primitive with respect to a texel box, in determining the minimum depth value with the graphics processing apparatus of FIG. 1;

FIG. 8 shows a texel box including part of a triangle primitive and part of an extension thereof through conservative rasterization, in carrying out intersection tests with the graphics processing apparatus of FIG. 1;

5. DETAILED DESCRIPTION OF EMBODIMENTS

Figure 1:
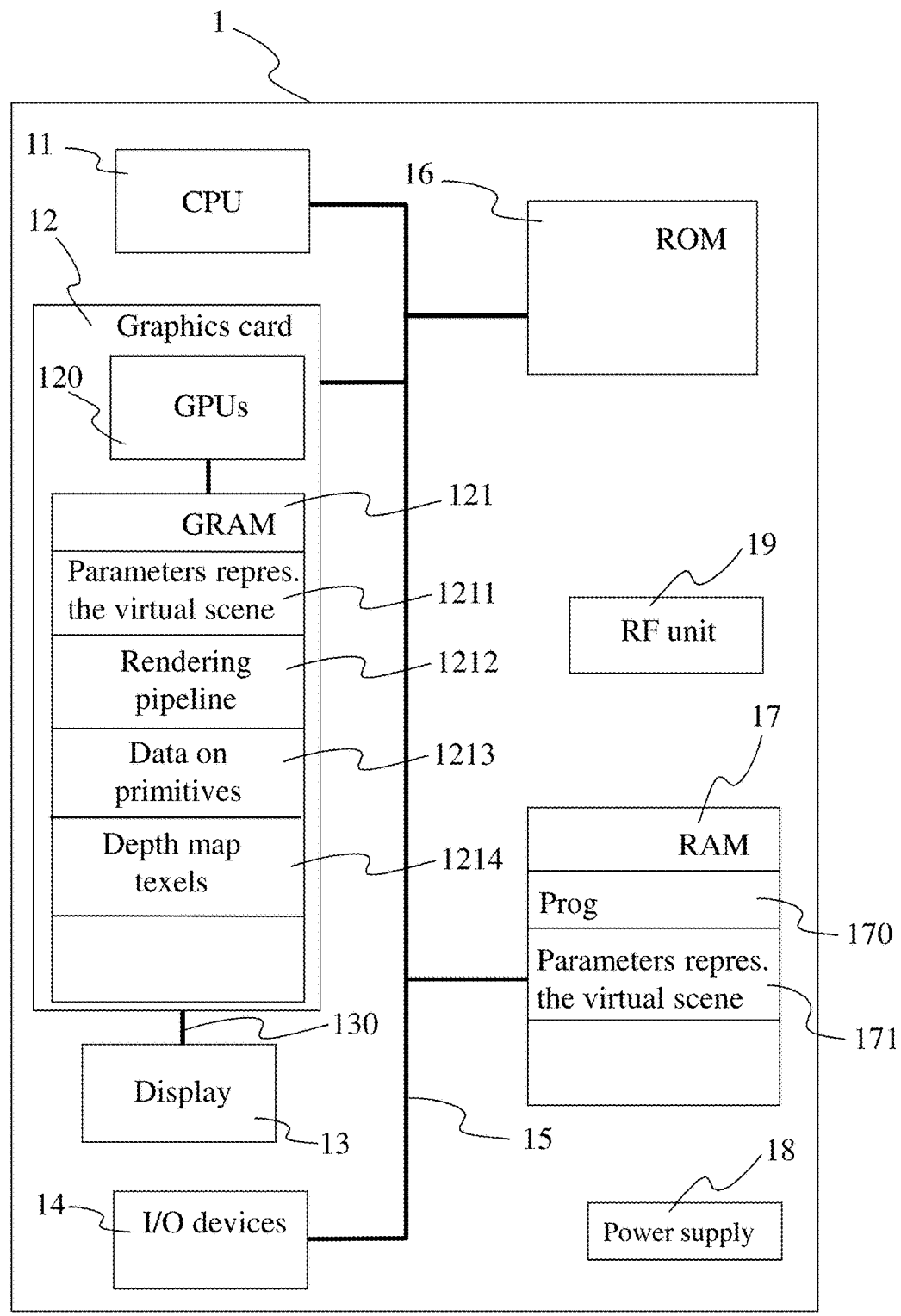

The present disclosure will be described in reference to a particular hardware embodiment of a graphics processing device, as diagrammatically shown on FIG. 1 for a graphics processing apparatus 1.

The memory resources can be available from any kind of appropriate storage means, which can be notably a RAM (Random Access Memory) or an EEPROM (Electrically-Erasable Programmable Read-Only Memory) such as a Flash memory, possibly within an SSD (Solid-State Disk).

The computation processing circuits are preferably multiple, and consist advantageously in processing cores of at least one GPU. Their number in each GPU can notably range from a few ones to several hundreds (e.g. 300). In particularly appropriate embodiments of the device, the computation processing circuits are then exploited for parallel processing of the pixels, a high number of cores being particularly appropriate then.

A GPU can include itself several warps, thereby providing potentially as a whole a high number of threads.

For sake of pure illustration, a GPU in a specific embodiment comprises 24 warps, each of which including 4 blocks of 8 threads—which makes 768 threads in the GPU. In another specific embodiment, the GPU comprises a unique warp including 16 blocks of 32 threads—which amounts to 512 threads in the GPU.

The apparatus 1 corresponds for example to a personal computer (PC), a laptop, a tablet, a smartphone or a games console—especially specialized games consoles producing and displaying images live.

The apparatus 1 comprises the following elements, connected to each other by a bus 15 of addresses and data that also transports a clock signal:

a microprocessor 11 (or CPU);

a graphics card 12 comprising:

several Graphical Processor Units (or GPUs) 120, a Graphical Random Access Memory (GRAM) 121;

a non-volatile memory of ROM (Read Only Memory) type 16;

a Random Access Memory or RAM 17;

one or several I/O (Input/Output) devices 14 such as for example a keyboard, a mouse, a joystick, a webcam; other modes for introduction of commands such as for example vocal recognition are also possible;

a power source 18; and a radiofrequency unit 19.

The apparatus 1 also comprises a display device 13 of display screen type directly connected to the graphics card 12 to display synthesized images calculated and composed in the graphics card, for example live. The use of a dedicated bus to connect the display device 13 to the graphics card 12 offers the advantage of having much greater data transmission bitrates and thus reducing the latency time for the displaying of images composed by the graphics card. According to a variant, a display device is external to apparatus 1 and is connected thereto by a cable or wirelessly for transmitting the display signals. The apparatus 1, for example the graphics card 12, comprises an interface for transmission or connection adapted to transmit a display signal to an external display means such as for example an LCD or plasma screen or a video-projector. In this respect, the RF unit 19 can be used for wireless transmissions.

It is noted that the word "register" used in the description of memories 121, 16, and 17 designates in each of the memories mentioned, both a memory zone of low capacity (some binary data) as well as a memory zone of large capacity (enabling a whole program to be stored or all or part of the data representative of data calculated or to be displayed). Also, the registers represented for GRAM 121 can be arranged and constituted in any manner, and each of them does not necessarily correspond to adjacent memory locations and can be distributed otherwise (which covers notably the situation in which one register includes several smaller registers).

When switched-on, the microprocessor 11 loads and executes the instructions of the program contained in the RAM 17.

The random access memory 17 notably comprises:

in a register 170, the operating program of the microprocessor 11 responsible for switching on the apparatus 1, parameters 171 representative of the scene (for example modelling parameters of the object(s) of the scene, lighting parameters of the scene).

The algorithms implementing the steps of the method specific to the present disclosure and described hereafter are stored in the memory GRAM 121 of the graphics card 12 associated with the apparatus 1 implementing these steps. When switched on and once the parameters 171 representative of the environment are loaded into the RAM 17, the graphic processors 120 of the graphics card 12 load these parameters into the GRAM 121 and execute the instructions of these algorithms in the form of microprograms of "shader" type using HLSL (High Level Shader Language) language or GLSL (OpenGL Shading Language) for example.

The random access memory GRAM 121 comprises notably:

in a register 1211, the parameters representative of the scene, in a register 1212, the rendering pipeline to be executed by the graphics card 12 for 3D rendering, in a register 1213, various data pertaining to primitives;

in a register 1214, depth map texels.

According to a variant, at least some of the data pertaining to primitives are stored in the RAM 17 and processed by the microprocessor 11. This variant however causes greater latency time in the composition of an image comprising a representation of the environment composed from microprograms contained in the GPUs 120 as the data must be transmitted from the graphics card to the random access memory 17 passing by the bus 15, for which the transmission capacities are generally inferior to those available in the graphics card for transmission of data from the GPUs 120 to the GRAM 121 and vice-versa.

According to another variant, the power supply 18 is external to the apparatus 1.

A depth map processed by apparatus 1 corresponds advantageously to an array of L lines and M columns of elements (L and M being integers greater than 0) and is associated with a scene which is rendered in one or more images. The number of elements comprised in the depth map corresponds for example to the number of pixels of the image(s) of the scene. The depth map is advantageously enriched with information representative of the variation of depth and with minimum depth values, as will be explained below.

Figure 2:
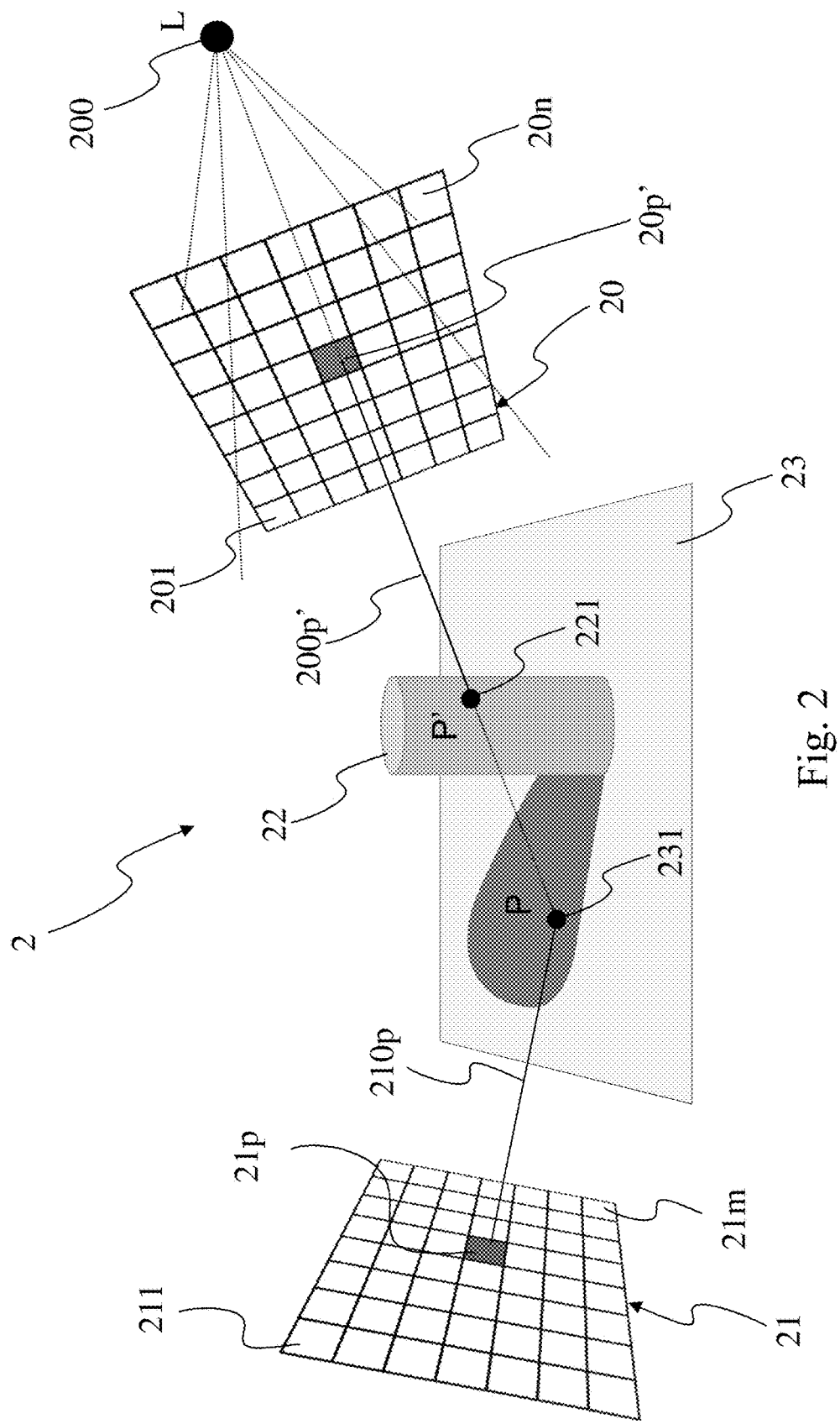
FIG. 2 shows an image and a depth map associated with a scene.

FIG. 2 shows a scene 2 rendered in an image 21 with an associated depth map 20 dedicated to shadows computing (also called shadow map), according to a particular and non-limitative embodiment. The image 21 represents the scene 2 as viewed from a given point of view (also called camera field of view, not represented on FIG. 2) and the depth map 20 is generated according to another point of view 200, associated with a light source L.

The scene corresponds for example to a virtual scene and comprises several virtual objects, i.e. a first object 22 and a second object 23. The objects 22 and 23 are modelled according to any method known to those skilled in the art, for example by polygonal modelling, in which the model is assimilated with a set of polygons (mesh elements) each defined by the list of summits and edges that compose it, by NURBS (Non Uniform Rational Basic Spline) type curve modelling in which the model is defined by a set of curves created via control vertices, by modelling by subdivision of surfaces. By virtual object is understood any virtual representation (obtained by modelling) of an object (real or fictitious) composing a real environment/real scene (for example the ground, a house or a house front, a person, a car, a tree, that is to say any element composing an environment such as a part of a house, a street, a town, the countryside, etc.) or an imaginary element. Each object 22, 23 of the scene 2 is characterized by a surface covering it, the surface of each object having reflectance properties (corresponding to the proportion of incident light reflected by the surface in one or several directions) that are specific to it.

The depth map 20 comprises n elements 201 . . . 20p' . . . 20n, n being an integer greater than 0 that defines the resolution of the depth map 20, the resolution being for example equal to 512×512 pixels, 1024×1024 pixels or 4096×4096 pixels. Depth information is associated with each element of the depth map 20. This depth information corresponds to the distance between the point of view 200 and the closest visible fragment of the scene 2 along a viewing direction passing through an element of the depth map, this element of the depth map being associated with the closest visible fragment of the scene. By taking the element 20p' as an example, the depth information associated with this element 20p' corresponds to the distance between the point of view 200 and the fragment P' 221 of the scene 2 along the viewing direction 200p' having as origin the point of view 200 and passing through the element 20$p'$. The fragment P' 221 corresponds to the first element of the scene crossed by the viewing direction 200$p'$ when starting from the point of view 200. The depth information is associated with the corresponding element of the depth map.

As will be developed below, the depth information is completed for each element of the depth map 20 with information representative of the variation of depth inside that element and with a minimum depth value. In a variant implementation, those complements are available for only part of the depth map 20.

The image 21 comprises m pixels 211 . . . 21$p$ . . . 21$m$, m being an integer greater than 0 that defines the resolution of the image 21. Advantageously, m is different from n, for example n is greater than m or m is greater than n (the resolution of the depth map 20 is for example 512×512 pixels, 1024×1024 pixels or 4096×4096 pixels whereas the resolution for the image 21 is for example 1024×768 pixels, 1280×720 pixels or 1920×1200 pixels). According to a variant, m is equal to n, both depth map 20 and image 21 having the same resolution. Attributes are advantageously associated with each pixel of the image 21, the attributes comprising for example color information (for example RGB information) and/or the translucent character of the fragment of the scene associated with a pixel of the image.

A fragment advantageously corresponds to a surface element associated with a point of the scene 2, the size of which being equal to the size of a pixel of the image 21 that may be displayed to represent the scene 2 on a display screen. A fragment of the scene 2 becomes a pixel in the image if the fragment is visible from the point of view associated with the image 21. As mentioned above, an element (for example a point) of the scene 2 is called a fragment when positioning in the space of the 3D scene and the same element visible from the point of view associated with the image 21 is called a pixel when positioning in the space of the image 21. Advantageously the fragment is defined by a set of data grouping together one or several of the following data items:

the rasterization position of the fragment,
  the depth of the fragment at the viewpoint,
  attributes (for example the color, the texture coordinates),
  the alpha channel representative of the translucent character of the fragment.

As to determine whether a fragment of the scene is visible from the point of view of the image 21, the well-known z-buffer method (also known as z-buffer algorithm) is used in association with one or more depth maps having the same point of view as the image 21 and having a structure similar to the depth map 20. The one or more depth maps having the same point of view as the image 21 and being used in the z-buffer algorithm are also called z-buffer(s). According to this method and by taking the pixel 21$p$ of the image 21 as an example, the depths of the fragments of the scene located along the viewing direction 210$p$ having as origin the point of view of the image 21 and passing through the center of the pixel 21$p$ are compared, and the fragment P 231 having the smallest depth (i.e. the shortest distance from the point of view along the viewing direction 210$p$) is the one whose attributes are associated with the pixel 21$p$. According to a variant, the well-known painter's algorithm is used for solving the visibility problem as to determine which fragment of the scene is visible for each pixel of the image 21 from the point of view of the image 21.

According to the example of FIG. 2, in which the point of view 200 corresponds to the light source L of the scene 2, the depth map 20 is used to determine which fragment of the scene 2 is lit by light source L and which fragment of the scene is in shadow. Then, as to determine whether the fragment P 231 (corresponding to the pixel 21$p$ of the image 21) is lit or in the shadow of an object of the scene 2, the fragment P 231 is projected into the depth map along a viewing direction linking the point of view 200 and the fragment P 231. For intersection tests, the distance $\|LP\|$ between the point of view 200 and the fragment P 231 is compared to the depth information $\|LP'\|$ associated with element 20$p'$ corresponding to the projection of the fragment P 231 into the depth map 20. If $\|LP\|$ is greater than $\|LP'\|$, then the fragment P 231 is in the shadow of the fragment P' 221 (i.e. the fragment P 231 is not directly lit by the light source L). If $\|LP\|$ is less than or equal to $\|LP'\|$, then the fragment P 231 is directly lit by the light source L. In an advantageous way, the depth information with which the distance $\|LP\|$ is compared is retrieved from depth information associated with the center of element 20$p'$ and from information representing the variation of depth inside element 20$p'$. This enables to determine with a better precision whether the fragment P 231 is lit or not by another fragment of the scene, especially when the projection point of the fragment P' 231 into the depth map does not coincide with the center of the element 20$p'$ while belonging to element 20$p'$. This enables to correct some defects related to the finite resolution of the depth map 20. Determining whether a fragment is lit enables to associate video information (e.g. RGB data) with the considered fragment in harmony with the character lit or not lit of the fragment when rendering the scene in the image 21, i.e. when rendering the pixels of the image 21 associated with the considered fragment. The rendering of the pixels of the image is then more precise with less or no artefact when compared to rendering method using depth maps of the prior art.

The intersection tests are combined with other specific features that will be developed below.

Figure 3:
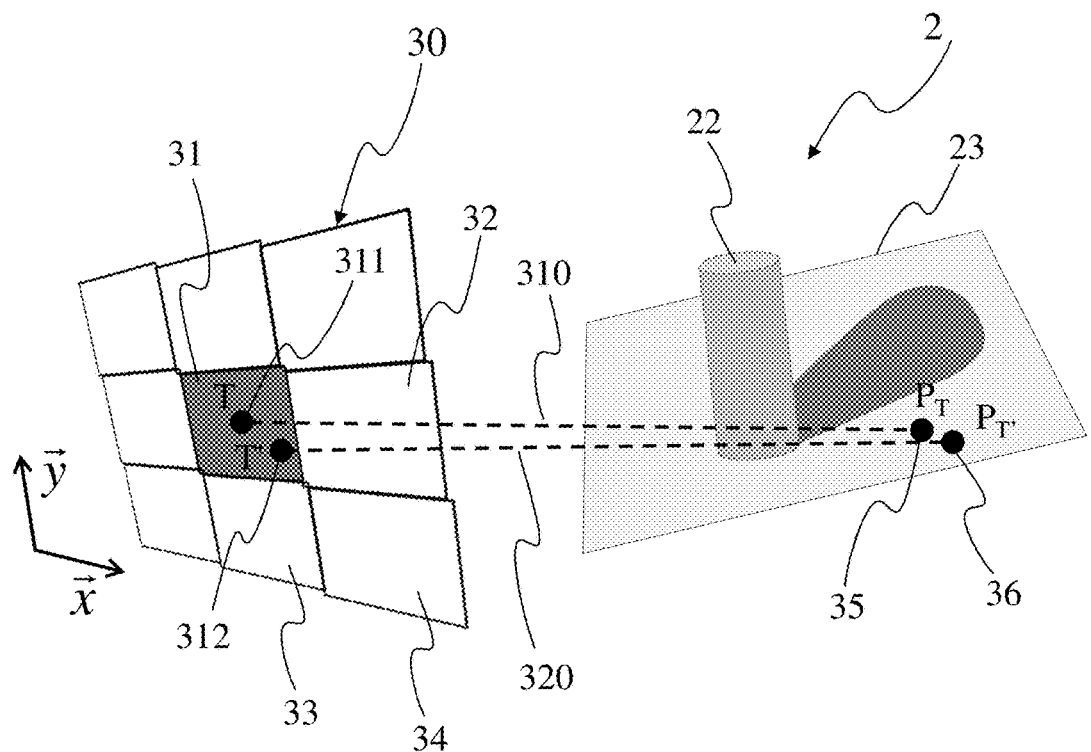
FIG. 3 shows a part of the depth map of FIG. 1, according to a particular embodiment of the present disclosure.

FIG. 3 shows a part 30 of the depth map 20 of FIG. 2, according to a particular and non-limitative embodiment. This part of the depth map is centered on a first element 31, which is surrounded by 8 elements of the depth map 20, among them the elements 32, 33 and 34, called second elements. A depth information representative of the distance between the point of view 200 (not represented on FIG. 3) and the fragment $P_T$ 35 is associated with the center T 311 of the first element 31. The point T 311 of the first element 31 corresponds to the projection point of the fragment $P_T$ 35 along the viewing direction 310 which passes through the first element 31. The point T' 312, which belongs to the first element 31, corresponds to the projection point of the fragment $P_{T'}$ 36 along the viewing direction 320 having as origin the point of view 300 associated with the depth map 30 and passing through the first element 31. The first fragment 35 and the second fragment 36 are advantageously close to each other (for example adjacent) and belongs to the same surface of an object of the scene, i.e. the surface of the object 23 which is lit by the light source L (not represented on FIG. 3) corresponding to the point of view 200 associated with the depth map 20. As to determine whether the fragment $P_{T'}$ 36 is lit during intersection tests, the depth of the fragment $P_{T'}$ 36 according to the point of view 200 is compared with the depth information associated with the point T' 312, which is computed by using the depth information associated with the first element 31 (or with the center T 311 of the first element 31) and the information representative of the variation of depth in the first element 31 that is (are) associated with the first element 31.

With the traditional depth maps of the prior art, the depth of the fragment $P_{T'}$ 34 would have only been compared with the depth information associated with the center T 311 of the first element 31, which may have led to visible artefacts. Indeed, by considering that the surface of the object 23 to which the two fragments 35 and 36 belong is nearly tangent to the viewing directions 310 and 320 of the first and second fragments (or in another words, the angle formed by the surface normal of the object 23 and by one viewing direction 310 or 320 is high, i.e. greater than a predetermined threshold angle, for example greater than 45°), the comparison of the distance $\|LP_{T'}\|$ with the depth associated with the center T 311 of the first element 31 (and which actually corresponds to the distance $\|LP_{T}\|$) could establish that the second fragment $P_{T'}$ 36 is in the shadow of the first fragment $P_{T}$ 35, especially when the second fragment $P_{T'}$ 36 is behind the first fragment $P_{T}$ 35 with regard to the point of view, or when the second fragment Pr 36 is located further from the first fragment $P_{T}$ 35 with regard to the point of view. This is of course an erroneous consideration due to the imprecision of the depth information stored in depth map of the state of the art that do not take the variation of depth over the first element 31 into account. Indeed, both fragments $P_{T}$ 35 and $P_{T'}$ 36 are lit by the light source L (or visible from the point of view 200) as they belong to one and same surface of the object 23 and as their projection points T 311 and T' 312 in the depth map belong to the same first element 31.

The rendering operations executed in the graphics card 12 will now be detailed. As illustrated on FIG. 4, a rendering pipeline 122 (stored in register 1212) is responsible for carrying out the associated actions in relation with depth map 20. The rendering pipeline 122 includes various stages, some of them being upstream rasterization and relating mainly to geometry generation, and some of them downstream and concerning fragments generated during the rasterization stage. The rasterization consists in breaking down each individual primitive available from the geometry generation into discrete elements, based on the data associated with the primitive. This amounts to turning the graphics format governing the primitives into pixels or dots for output on the display device 13 or other output devices, or for storage in a bitmap file format. More precisely, a rasterizer (not represented on FIG. 4) produces fragments, each of which represents a sample-sized segment of a rasterized primitive at the scale of a pixel—namely, the size covered by a fragment corresponds to a pixel area.

Figure 4:
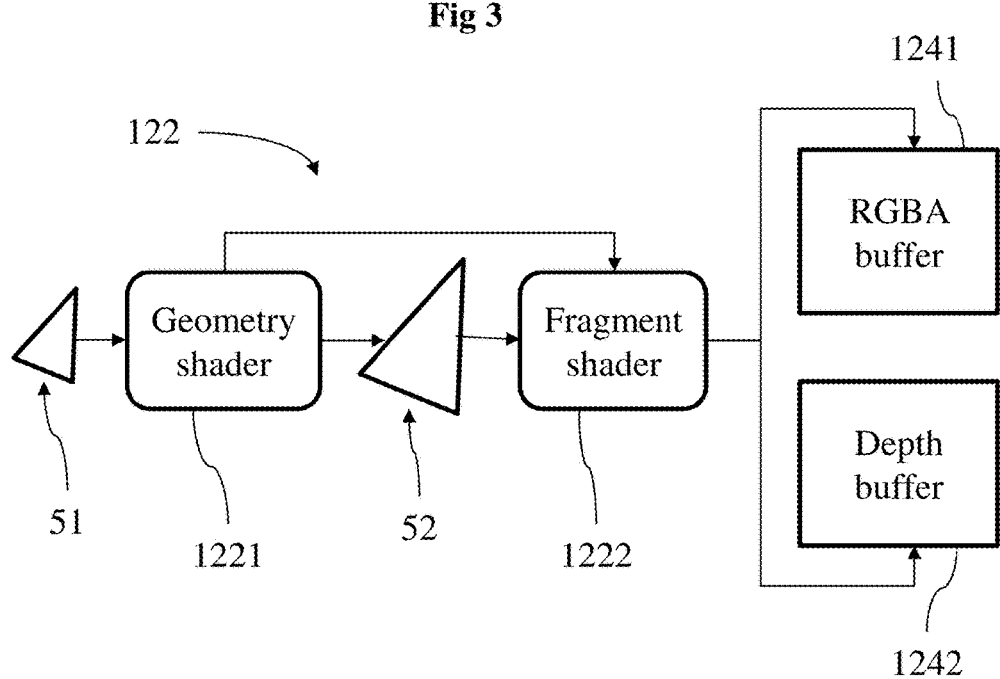
FIG. 4 represents a rendering pipeline generated with the graphics processing apparatus of FIG. 1.

On FIG. 4, only pipeline stages relevant to the present disclosure have been represented. A geometry shader 1221 is part of the stages concerned with geometry generation. It receives inputs consisting in primitives generated from previous stages. The primitives (or geometric primitives) are the simplest handled geometric objects, or elementary geometries, obtained from the conversion of vertices by graphics language APIs such OpenGL or Direct3D. Those previous stages include a vertex shader handling the processing of each vertex of input geometries (corresponding to the parameters representing the scene stored in CPU register 171 and GRAM register 1211), and a tessellation shader that takes vertices output from the vertex shader, pulls them into primitives, and tessellates the latter. In the example case, the resulting primitives have the form of triangles 51.

The geometry shader 1221 has access to all the vertices that form every received primitive. It governs the processing of primitives in function of instructions comprised in that shader 1221. According to the present disclosure, it further executes the computation of conservative primitive extent, for conservative rasterization. Namely, in the illustrated example, the geometry shader 1221 is responsible for geometry amplification of the input triangles 51 into super-sized triangles 52. The primitive extension, relying on oversizing original primitives by moving their edges outwards, is known to a skilled person for conservative rasterization and notably described in above cited references by Hertel et al. dated 2009 and by Hasselgren et al. dated 2005.

The outputs of the geometry shader 1221 are submitted as inputs to a rasterizer, so as to produce fragments, interpolating operations being carried out for the fragments in order to compute data values between vertices—attributes are computed for each pixel based on the vertex attributes and the pixel's distance to each vertex screen position.

A fragment shader 1222, which is in charge of processing those fragments, outputs a set of colors and alpha values, depth values and stencil values. More precisely, the fragment shader 1222 is adapted to process each fragment so as to obtain RGBA values and a depth value. If a fragment is visible from the light source L, the pixel of the rendered synthesis image is then considered as lit and the color attributes corresponding to the fragment are then associated with that pixel.

In the frame of the present disclosure, the fragment shader 1222 together with the rasterizer are in charge of proceeding with RGBA encoding of the received expanded primitives corresponding to conservative rasterization—i.e. here the triangles 52, and with specific computations of minimum depths (for the respective elements of depth map 20). In this respect, it is configured to receive original primitive coordinates from the geometry shader 1221. The produced encoded primitives and minimum depths are stored respectively in two buffers 1241 and 1242.

Figure 5:
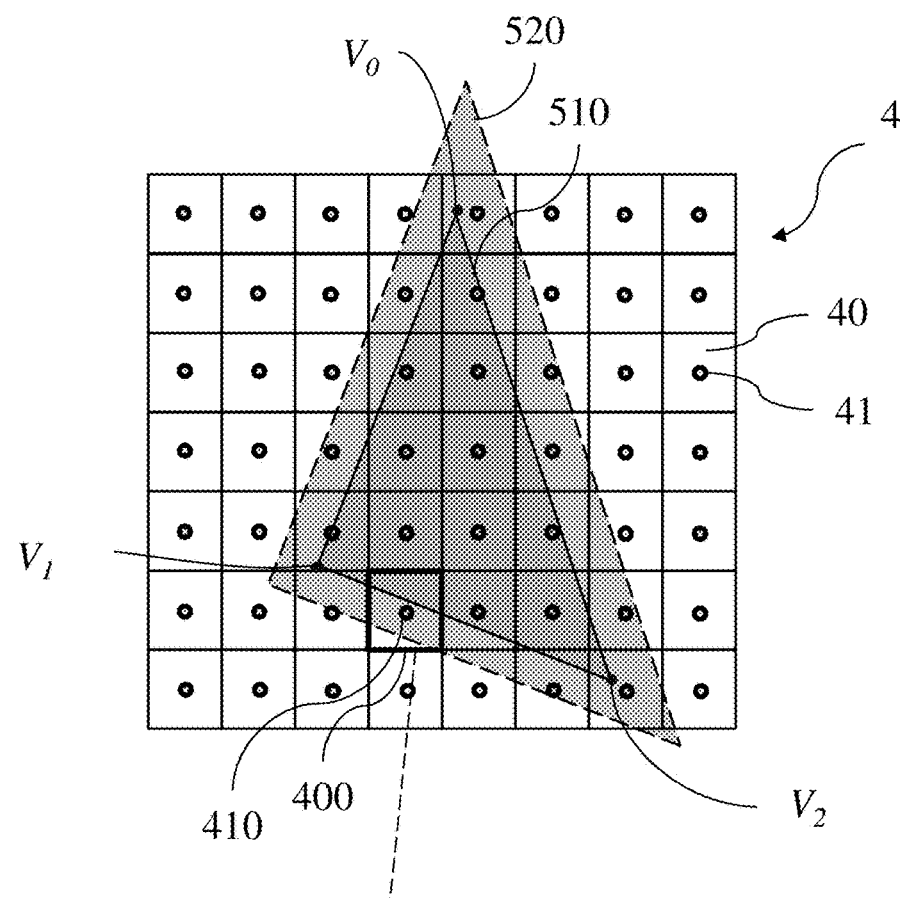
FIG. 5 illustrates a texel array with conservative rasterization for a triangle primitive, carried out with the graphics processing apparatus of FIG. 1.
Figure 6:
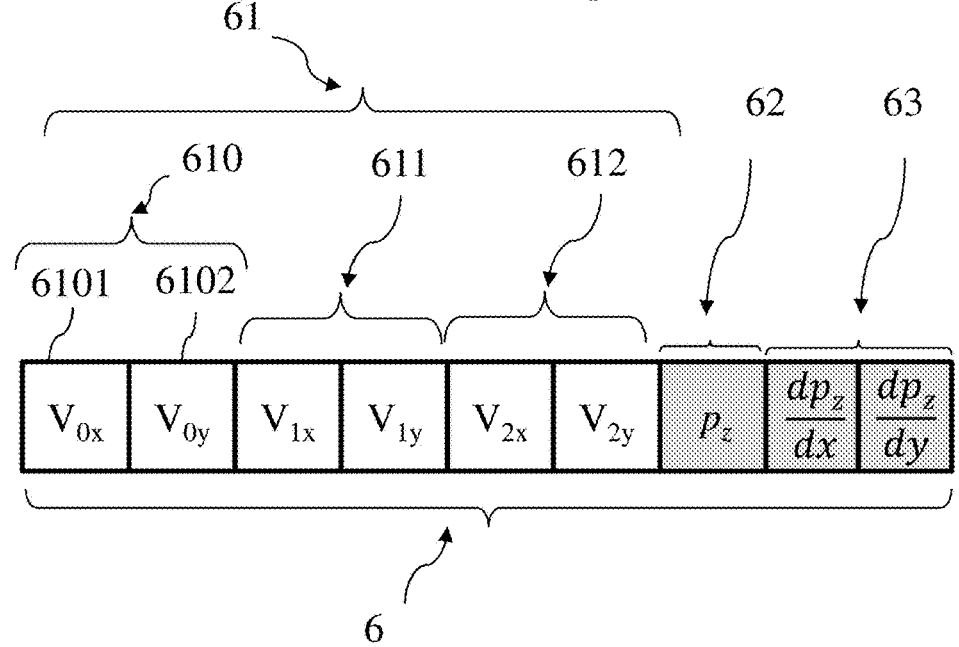
FIG. 6 shows a texel storage including geometric information, as used in the texel array of FIG. 5.

FIGS. 5 and 6 are dedicated to the conservative rasterization process with the recording of appropriate geometric information associated with the primitives into the depth map elements. On FIG. 5, an example of a part 4 of the depth map 20 is represented, which includes a number of texels 40 (corresponding to the depth map elements) that form an array of texels. Each texel 40 is associated with a rectangular shape delimited by a texel box and having a center 41. A closest visible original input triangle, as projected onto the depth map 20 and referenced 510, has three vertices V0, V1, V2 with respective coordinates $(V_{0x}, V_{0y})$, $(V_{1x}, V_{1y})$, $(V_{2x}, V_{2y})$. It is changed to an expanded triangle during the phase of primitive processing by the geometry shader 1221, this expanded triangle, once projected onto the depth map 20, being referenced 520.

During the processing by the fragment shader 1222, each texel 40 having its center 41 covered by the expanded triangle 520 is associated with the latter. Then, geometric information regarding triangle 510 is explicitly stored in texel 40 in a compact form, including its vertices V0, V1, V2, its depth $p_z$ evaluated or extrapolated at the center 41 of texel 40 and the partial derivatives of its depth $$\frac{dp_z}{dx}, \frac{dp_z}{dy} - \text{representing its depth gradient.}$$

The texels used for storing that geometric information are in particular implementations RGBA texels of the depth map 20.

For sake of illustration, the texel 400 has its center 410 covered by extended triangle 520, though the original triangle 510 does not reach that center 410 but overlaps it partly. Due to conservative rasterization, the triangle 510 is thus associated with texel 400 and stored in associated texel storage 6 as visible on FIG. 6.

The texel storage 6 corresponds e.g. to RGBA storage with 128 bits. The six vertices coordinates of triangle 510 are recorded sequentially into a first part 61 of texel storage 6, each under 16 bits, the x direction corresponding to the higher bits and the y direction to the lower bits. The first part 61 thereby comprises three sub-parts 610, 611 and 612 respectively associated with vertices V0, V1 and V2, each of those sub-parts being itself split into two coordinates spaces (e.g. spaces 6101 and 6012 for respectively $V_{0x}$ and $V_{0y}$). The depth $p_z$ in light space at texel center 410 is recorded into a second part 62 of texel storage 6, as e.g. 16 higher bits; while the depth partial derivatives $$\frac{dp_z}{dx} \text{ and } \frac{dp_z}{dy}$$

are recorded into a third part 63, as e.g. 2×8 lower bits. The depth evaluated at the center 410 of texel 400 is based on linear extrapolation of the depth of triangle 510.

Preferably, the depth partial derivatives $$\frac{dp_z}{dx} \text{ and } \frac{dp_z}{dy}$$

are computed and stored in a compressed form as detailed in previous patent applications WO 2014/124870 A1 and WO 2014/124871 A2 to Thomson Licensing cited above. In particular, a similar storing form, but exploited in a different way, is taught in WO 2014/124870 A1.

Thanks to the arrangement described above, a single texture fetch is required for accessing the triangle information instead of deferred random accesses using triangle IDs.

In particular advantageous implementations, when two or more expanded triangles 52 are covering the center 41 of texel 40, the triangle information stored for texel 40 corresponds to the triangle 51 having the smallest minimum depth value.

In addition to previous geometric values stored in texels 40 for triangles 51, a minimum depth value is computed and stored for each of those texels 40. For a given texel 40, it corresponds to the minimum depth effectively reached by all triangles 51 having their expanded forms 52 covering the center 41 of texel 40, which amounts preferably to all triangles overlapping texel 40 at least partly. That minimum depth value is exploited for an efficient preliminary classification of lit pixels. Namely, if the depth of a view sample projected in light space is less than or equal to the minimum depth stored in the corresponding texel, the pixel corresponding to the view sample is classified as fully lit.

The computation of the minimum depth by the fragment shader 1222 is illustrated on FIGS. 7A, 7B, 7C and 7D, representing a texel 40 having a center 41 and a texel area box 42 surrounding it, overlapped by respective triangles 51A, 51B, 51C and 51D. The center 41 together with its Cartesian coordinates in the depth map 20 is noted C ($C_x$, $C_y$). The minimum depth is preferably derived from the depth $p_z$ and the partial depth derivatives $$\frac{dp_z}{dx} \text{ and } \frac{dp_z}{dy}$$

obtained and stored for texel 40 during shadow map generation, which enables to speed up the finding of that minimum depth. More precisely, the partial derivatives indicate depth variation along respective shadow map axes, and form a two-dimensional gradient vector indicating the decreasing direction in texel 40. That depth gradient vector, noted respectively 71A, 71B, 71C and 71D (generic notation: 71) for triangles 51A, 51B, 51C and 51D (generic notation: 51), is used for selecting the triangle edge that holds the smallest depth, noted respectively 72A, 72B, 72C and 72D (generic notation: 72). It is identified as the one with normal vector, noted respectively 73A, 73B, 73C and 73D (generic notation: 73), which is closest to depth gradient vector—which can be established by determining the biggest scalar product between the depth gradient vector 71 and the vectors normal to the edges of triangle 51. Once identified, intersections of the relevant edge 72 with the texel box 42 are performed, which provides intersection points exploited for determining the minimum depth.

For a given triangle 51, having depth $p_z$ at center 41 and partial depth derivatives $$\frac{dp_z}{dx} \text{ and } \frac{dp_z}{dy},$$

the depth at an intersection point or at a vertex of that triangle 51, that point being noted M ($M_x$, $M_y$), is given by equation Eq1:

$$\text{Depth} = p_z + (M_x - C_x)\frac{dp_z}{dx} + (M_y - C_y)\frac{dp_z}{dy} \quad \text{(Eq 1)}$$

This formula is exploited as follows in computing the minimum depth:

- if two intersection points are found, the minimum depth is the smaller of the two values given by Eq1 for both of them—which corresponds to the case of FIG. 7A;
- if one intersection point is found, a triangle vertex is inside texel 40, so that the minimum depth is the smaller of the two values given by Eq1 for the vertex location and the intersection point—which corresponds to the case of FIG. 7B;
- if no intersection point is found, the edge 72 is either fully inside or fully outside the texel box 42; if that edge 72 is fully inside, the minimum depth is the smaller of the two values given by Eq1 for the two triangle vertices inside the texel box 42; otherwise, if that edge 72 is fully outside, intersections are performed between the edges of triangle 51 adjacent to the selected edge 72 and the texel box 42; then:
  - if only one intersection is found on each box side pointed by depth gradient 71, the minimum depth is computed at the box corner between those box sides—which corresponds to FIG. 7C; that value is given by equation Eq2:

$$\text{Depth} = p_z + 0.5\frac{dp_z}{dx} + 0.5\frac{dp_z}{dy} \quad \text{(Eq 2)}$$

- otherwise, if two intersections are found, the minimum depth is the smallest of the three values given by Eq1 for the vertex location and the intersection points;

and if smallest of the four values given by Eq1 for the intersection points—which corresponds to the case of FIG. 7D;
  if no intersection is found, the triangle 51 fully covers the texel 40, so that the minimum depth is found at texel border using equation Eq2.

When a texel 40 is covered or overlapped by two triangles or more, which are kept from the conservative rasterization process, the minimum depth value for that texel 40 is given by the smallest of the minimum depths for all those triangles.

Once determined, the minimum depth is exploited for preliminary filtering: whenever a depth for a view sample is smaller than the stored minimum depth for a given depth map element, the corresponding pixel is classified as lit. Otherwise, the fragment shader 1222 is configured for carrying out the following operations.

The geometric information stored in each texel 40 of part 4 of the depth map 20, corresponding to the selected triangle 51 having the smallest depth at the center 41 of texel 40, is exploited for shadow ray intersection tests. In this respect, the depth $d_z$ for a considered view sample projected onto a point S ($S_x$, $S_y$) inside texel 40 is compared with the depth $d'_z$ computed from the depth value $p_z$ and the partial depth derivatives $$\frac{dp_z}{dx} \text{ and } \frac{dp_z}{dy}$$

at the center 41 of texel 40. The latter is given by formula Eq3, similar to Eq1:

$$d'_z = p_z + (S_x - C_x)\frac{dp_z}{dx} + (S_y - C_y)\frac{dp_z}{dy} \qquad \text{(Eq 3)}$$

If the depth $d_z$ for the view sample is superior to the interpolated depth $d'_z$ and projection point S is inside the considered triangle 51, then the associated pixel is classified as shadowed. Otherwise, the fragment shader 1222 is configured for carrying out the following operations.

This is illustrated in relation with FIG. 8, showing a particular texel 401 with its center C referenced 411. That texel 401 is partly overlapped by a triangle 510, which does not cover its center 411. However, the expanded triangle 520 resulting from conservative rasterization is covering that center 411, so that triangle 510 is relevant to texel 401. Also, it is supposed in the illustrative example that triangle 510 is recorded for texel 401—namely, it is the one corresponding to the smallest minimum depth value, if several triangles 51 are relevant. Consequently, the intersection test at point S is given by equation Eq3.

The intersection test is given by the following algorithm:

```
If (d'_z ≥ d_z) then
    return no_intersection         // early rejection
else
    if (S is inside the 2D triangle)  // simple 2D test
        return intersection           // i.e. shadow
    return no_intersection
```

The present shadow ray intersection test is particularly advantageous because it is significantly less expensive than shadow ray intersection with full 3D coordinates. It is accomplished by using inexpensive early rejection test and simple 2D point in triangle. Also, as mentioned above, triangle information is directly available through a texture fetch.

For areas where the lit status of view samples remains uncertain, namely for a pixel not classified as lit from comparison with the minimum depth, nor shadowed from the intersection test, a shadow ray is spawned towards the light source L and it is looked for an intersection. If an intersection is found, the pixel is determined as shadowed; otherwise, it is determined as lit.

That ray-tracing operation relies on a GPU ray tracer and on spatial acceleration structures for faster intersection determination. Basically, a ray traverses a tree of sub-spaces (e.g.: octree, k-d tree, LBVH) until reaching a lead that contains geometry. Intersection test is done on each triangle contained in such leaf.

In addition, according to preferred implementations, the ray has a length that is limited by the minimum depth value stored in depth buffer 1242 for the considered depth map element. Indeed, thanks to conservative rasterization, it is ensured that no other geometry is present beyond the ray.

This is advantageous in preventing visiting empty sub-spaces during the ray traversal and thus in improving efficiency of the GPU ray-tracer.

Figure 9:
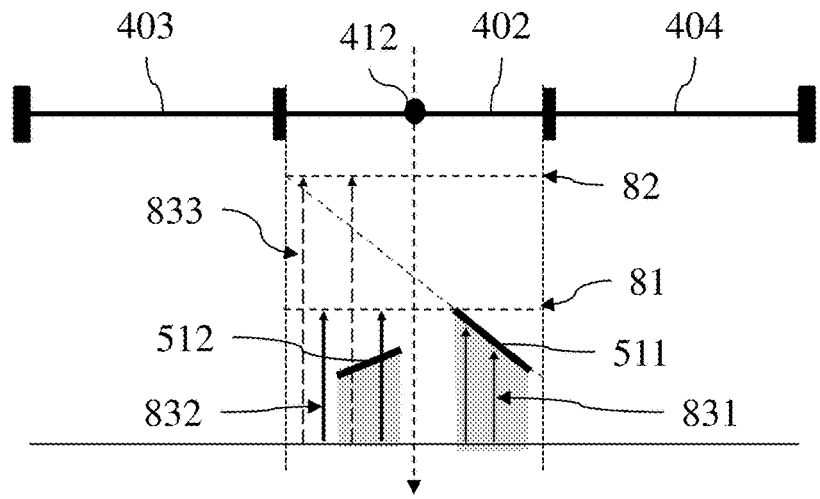
FIG. 9 illustrates the application of rendering steps, with the graphics processing apparatus of FIG. 1, to a texel partly covered by two surface elements, including determination of minimum depth value, intersection tests and ray tracing.

The three operations including comparison with minimum depth value, 2D intersection tests and ray tracing are illustrated on FIG. 9, which represents a cross view of a texel 402 having a center 412, neighbored by two texels 403 and 404 (shown in the horizontal direction). Schematically, two triangles 511 and 512 as projected onto the depth map 20 are overlapping the texel 402, none of them covering the center 412. However, the extrapolation of both triangles 511 and 512 at the center 412 leads to a smaller depth value for triangle 511, which is thus associated with texel 402 and accordingly stored. On FIG. 9, the vertical direction is representative of the depth—namely the distance to the light source L, that depth decreasing upwards. In this respect, the stored information related to triangle 511 for texel 402 has a minimum depth value 81.

As visible on FIG. 9, view samples corresponding to depths superior to the minimum value 81 and further having projections into texel 402 located inside the projection of triangle 511 can be decided as shadowed by mere 2D intersection tests—which corresponds to rays 831. Also, view samples corresponding to depths inferior to the minimum value 81 are systematically classified as lit, whether projected inside the projection of triangle 511 or not. By contrast, view samples corresponding to depths superior to the minimum value 81 and not projected into the projection of triangle 511 remain uncertain, and need 3D ray-tracing as for rays 832.

It is interesting to point out advantages with respect to prior solution disclosed by Hertel et al. dated 2009 cited above, which uses a minimum depth value given by a slope scale depth correction that shifts triangle towards the light source such as the depth value at texel center corresponds to the minimal value found in the texel area crossed by the triangle plane. That minimum depth value is e.g. referenced as 82 on FIG. 9. First, the filtering effected during the preliminary operation in the present disclosure enables to identify correctly more pixels as lit; secondly, the combination of that preliminary filtering and of the intersection test, carried out for pixels not classified as lit, significantly reduces expensive ray-tracing operations; thirdly, even when ray-tracing is carried out in the present disclosure, the length of the ray is reduced with respect to the prior art solution. In particular, as visible on FIG. 9, ray-tracing for rays 832 do not need to be extended up to the minimum depth value 82 (rays 833), as needed with the known solution.

An improved implementation of the graphics processing apparatus 1 will now be described. According to this implementation, the 2D intersection tests following the comparison with the minimum depth are not only performed for the stored primitive associated with the concerned element of the depth map 20, but also for the stored primitives associated with the neighboring depth map elements. Preferably, this is executed for the immediate neighbor elements with respect to the concerned depth map element, which are usually consisting in 8 elements—except at the borders of the depth map 20, or of the involved part of the depth map 20, where their number is lower.

Accordingly, considering one of the texels 40 of part 4 of the depth map 20, eight texels surrounding that texel are queried in the neighborhood and corresponding recorded triangles are retrieved, if the considered texel is not yet classified as lit or as shadowed further to the operations (comparison with the minimum depth, intersection test) effected with the solution focused on the geometric information stored in the considered texel. Direct ray intersection is then performed on that triangle set for the considered texel, and if an intersection is found, that pixel is classified as shadowed.

That solution can prove particularly advantageous for a proper classification of pixels lying at shadow edges. It avoids the need of a full ray-tracing operation for the intersections identified with the surrounding triangles.

Figure 10:
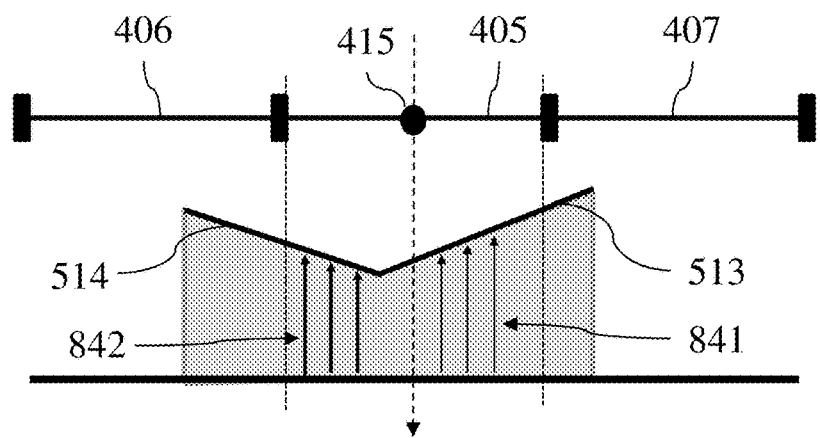
FIG. 10 illustrates the application of rendering steps, with the graphics processing apparatus of FIG. 1, to a texel partly covered by two surface elements.
Figure 11:
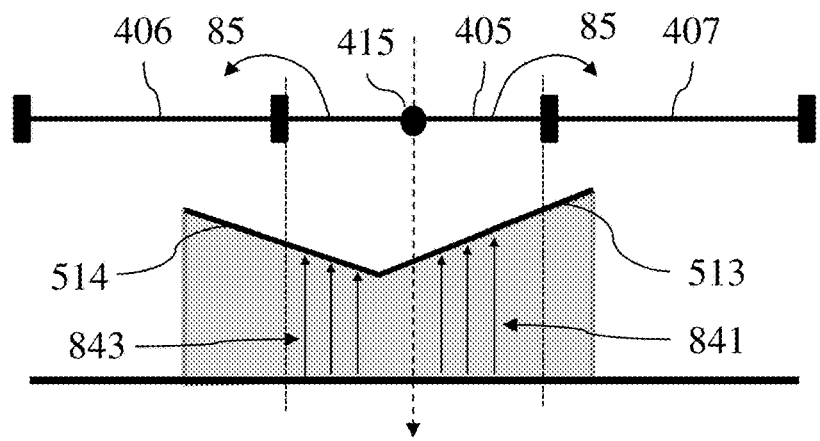
FIG. 11 illustrates the application of rendering steps, with an improved version of the graphics processing apparatus of FIG. 1, to the texel partly covered by two surface elements of FIG. 10.

This is illustrated on FIGS. 10 and 11, where FIG. 10 relates to the implementation without considering neighboring texels and FIG. 11 relates the implementation with considering the latter. In the representations, the same conventions as on FIG. 9 are adopted. A texel 405 having a center 415 and neighbor texels 406 and 407 is overlapped by the projections onto the depth map 20 of two triangles 513 and 514. The projection of triangle 513 covers the center 415 of texel 405, while the projection of triangle 514 has an extrapolated depth value at that center 415 that is inferior to the depth value for triangle 513. Consequently, triangle 513 is associated with texel 415. As seen previously, pixels corresponding to a depth superior to the recorded minimum depth and having an intersection with triangle 513 determined through a 2D intersection test are classified as shadowed (rays 841). Conversely, pixels having a depth superior to the recorded minimum depth and having a projection into texel 405 outside the projection of triangle 514 are considered as having an uncertain lighting status and require ray-tracing operations (rays 842).

With the improved solution represented on FIG. 11, where the triangles associated with neighbor texels 406 and 407 are taken into account for intersection tests, a neighborhood texture look-up 85 is executed. Accordingly, further to 2D intersection tests with triangle 513, similar tests are available for triangle 514 regarding texel 405. Therefore, instead of ray-tracing, pixels corresponding to a projection into texel 405 and inside the projection of triangle 514, and meeting the related intersection test, are classified as shadowed—as shown with rays 843.

The full operations for complete pixels classification by the fragment shader 1222 can be therefore summarized as follows with the improved embodiment:
1. Query texel 40 of depth map 20 at view sample S projection.
2. Compute the minimum depth or retrieve it directly from the depth buffer 1242.
3. If the minimum depth stored in the texel 40 is greater or nearly equal to the depth of the view sample in light space, then the view sample (or pixel) is classified as lit.
4. If not, proceed with 2D test intersection with the triangle 51 as stored in the texel 40.
5. If an intersection is found, the view sample is classified as shadowed.
6. If not, proceed with 2D test intersection with triangles as stored in surrounding texels—preferably immediate neighbors, usually eight in number.
7. If an intersection is found, the pixel is classified as shadowed.
8. Otherwise, pixel is classified as uncertain—which requires GPU ray-tracing.

In an alternative embodiment, instead of being implemented in the fragment shader 1222 and executed at rendering time, the full classification is implemented in a computing kernel, such as in the framework of OpenCL, CUDA or a Compute Shader, in image space using a G-buffer.

Figure 12:
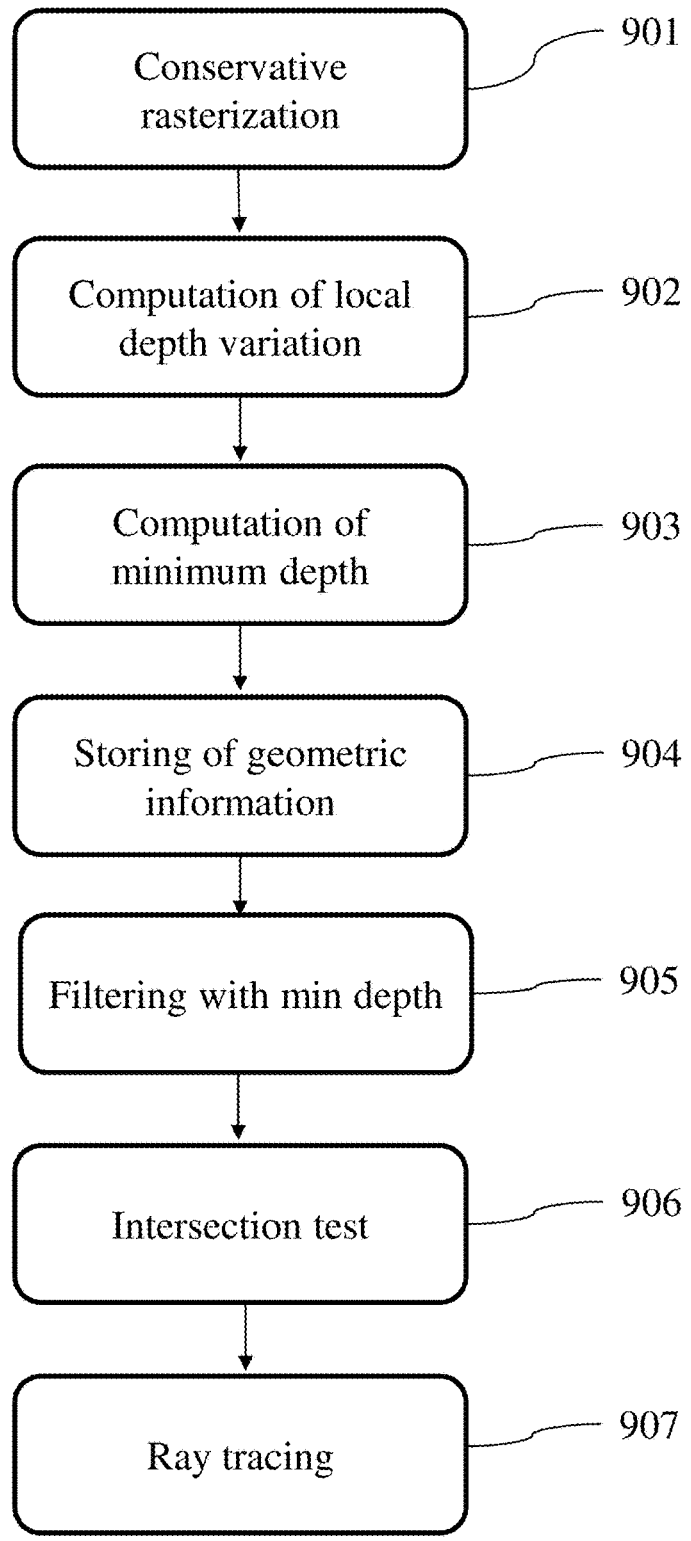
FIG. 12 is a flow chart showing successive rendering steps executed with the graphics processing apparatus of FIG. 1.

As a whole, as illustrated on FIG. 12, main steps executed by the graphics processing apparatus 1 (preferably by graphics card 12) include:
applying conservative rasterization in step 901,
computing local depth variations (partial depth derivatives) for depth map elements in step 902,
computing minimum depths in step 903,
storing appropriate geometric information associated with depth map elements in step 904,
filtering the lighting status of pixels with minimum depths in step 905,
proceeding with 2D intersection tests in step 906,
effecting ray tracing in step 907.

Figure 13:
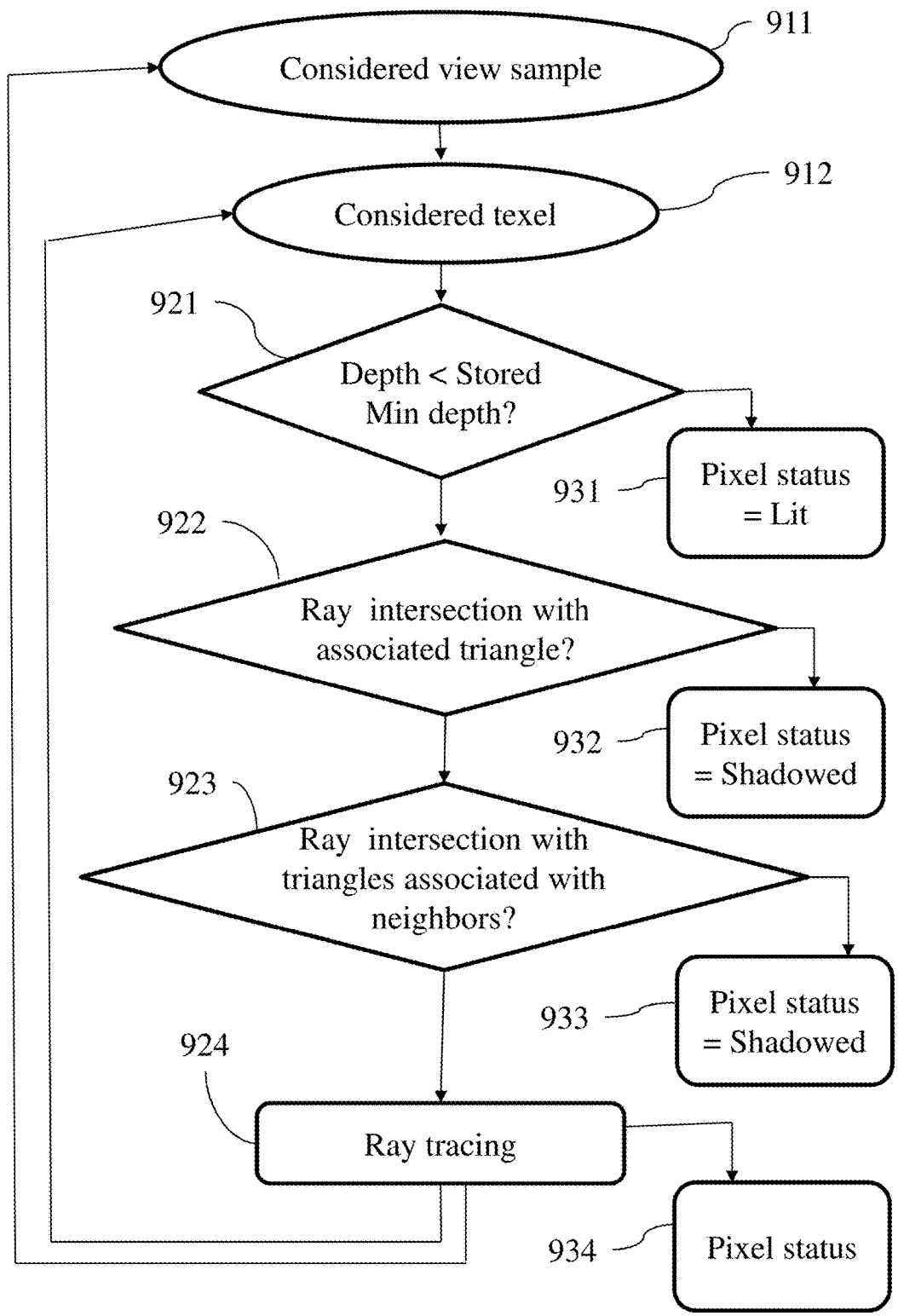
FIG. 13 is a flow chart detailing steps performed within the flow chart of FIG. 12, as applied to view samples and texels for shadow rendering.

More precisely, as shown on FIG. 13, the specific steps carried out for rendering shadows in relation with view samples and with texels having relevant information already recorded are as follows:
for a given view sample or texel 911 and a given texel 912, compare the depth associated with the texel to the stored minimum depth in step 921;
if it results from the comparison that the depth is inferior to the stored minimum depth, set the pixel status to lit in step 931;
otherwise, proceed with 2D ray intersection test for the considered texel 911 with the triangle (or other primitive) associated with the texel 912;
if the test results in intersection with the triangle, set the pixel status to shadowed in step 932;
otherwise, proceed with 2D ray intersection tests for the considered view sample 911 with the triangles (or other primitives) associated with the texels neighboring texel 912;
if the tests result in intersection with any of those triangles, set the pixel status to shadowed in step 933;
otherwise, proceed with ray tracing for that pixel 911 and that texel 912 in step 924;
produce resulting pixel status (lit or shadowed) in step 934.

The same process is iterated for all considered pixels and texels. Preferably, parallel GPU processing is exploited for quite efficient processing.

Naturally, the present disclosure is not limited to the embodiments previously described.

In particular, the present disclosure extends to any device implementing the described graphics processing method and notably to any devices comprising at least one GPU. The implementation of calculations necessary to the pixels classification is not limited either to an implementation in shader type microprograms but extends to an implementation in any program type, for example programs that can be executed by a CPU type microprocessor.

The use of the present disclosure is not limited to a live utilization but also extends to any other utilization, for example for processing known as postproduction processing in a recording studio for the display of synthesis images for example.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A graphics processing device configured to compute shadow in a three-dimensional scene lighted by at least one light source, based on a plurality of depth maps, a depth map of said plurality of depth maps comprising a plurality of elements, said depth map being associated with a two-dimensional bounded space adapted to render an image of the scene according to a point of view of said light source, said graphics processing device comprising at least one processor configured for implementing the following acts, for a depth map of said plurality of depth maps:

storing information representative of a depth consisting of the distance between said point of view and a closest visible surface from said point of view for each of said elements of said depth map;

storing in each element of at least one part of said depth map, coordinates of vertices of at least one surface element of a closest visible surface, the coordinates being expressed in said two-dimensional bounded space of said depth map;

storing in each element of said at least one part of said depth map, information representative of local depth variation of said at least one surface element in said two-dimensional bounded space of said depth map;

for a pixel of a plurality of pixels of said image, testing ray intersection in said at least one part of said depth map, with said at least one surface element having depth computed for said pixel from said information representative of depth and of local depth variation, taking into account said coordinates of vertices;

computing one minimum depth associated with said at least one surface element for each element of said at least one part of said depth map, said minimum depth being computed from said coordinates of vertices and said information representative of depth and of local depth variation;

comparing depth associated with said pixel of said image, located in a depth map element, with said minimum depth associated with said depth map element and with said at least one surface element;

classifying said pixel as lit if the depth associated with said pixel is lower than said minimum depth;

classifying said pixel as shadowed if the depth associated with said pixel is greater than said minimum depth, and if a ray intersection is found for said pixel with said at least one surface element from said ray intersection testing.

2. The graphics processing device according to claim 1, wherein said at least one processor is further configured to classify said pixel as uncertain if said pixel is not classified as lit and is not classified as shadowed, and to trace a ray having as origin a scene fragment of the three-dimensional scene corresponding to said pixel toward said point of view to determine whether said pixel is lit.

3. The graphics processing device according to claim 2, wherein said at least one processor is further configured for tracing said ray only up to a distance to said point of view corresponding to said minimum depth associated with said depth map element in which said pixel is located.

4. The graphics processing device according to claim 1, wherein said depth map element in which said pixel is located having neighbor depth map elements belonging to said at least one part of said depth map, said at least one processor is further configured to compute said minimum depth for said depth map element also from said coordinates of vertices and said information representative of depth and of local depth variation stored in said neighbor depth map elements for said at least one surface element associated with said neighbor depth map elements.

5. The graphics processing device according to claim 4, wherein if a depth associated with said pixel is greater than said minimum depth for said depth map element and if said pixel is not classified as lit and is not classified as shadowed, said at least one processor is further configured:
for additionally testing ray intersection for said pixel with at least one other surface element, associated with said neighbor depth map elements, having depth computed in said depth map element from said information representative of depth and of local depth variation stored in said neighbor depth map elements, taking into account said coordinates of vertices stored in said neighbor depth map elements;
for classifying said pixel as shadowed if a ray intersection is found for said pixel with said at least one other surface element from said additional ray intersection testing.

6. The graphics processing device according to claim 4, wherein for said depth map element, said neighbor depth map elements consist of eight neighbor depth map elements surrounding said depth map element.

7. The graphics processing device according to claim 1, wherein each of depth map elements having a center, said at least one processor is further configured for:
proceeding with a preliminary expansion of each of said at least one surface elements to one respectively expanded surface element in determining said depth map element associated with said surface element;
determining for each of said depth map elements, at least one expanded surface element covering the center of said depth map element;
selecting among said at least one expanded surface elements covering the center of said depth map element, the expanded surface element, among said at least one expanded surface elements, having a smallest depth at said center;
for said depth map element belonging to said at least one part of said depth map, storing said coordinates of vertices and said information representative of depth and of local depth variation associated with a selected surface element into said depth map element.

8. The graphics processing device according to claim 1, wherein said at least one processor is further configured for computing said minimum depth at at least one point of said depth map element and of a projection in the two-dimensional bounded space of said depth map of said at least one surface element, called a closest point, said closest point being determined by means of a gradient of decreasing depth variation in said space of said depth map for said at least one surface element, given by said information representative of local depth variation.

9. The graphics processing device according to claim 8, wherein said depth map element having sides and corners in said space of said depth map and said at least one surface element having edges expressed in said space of said depth map, said closest point is determined by:
identifying by means of said gradient, among the edges of said at least one surface element, a closest edge having a smallest depth;
performing intersections between said closest edge and the sides of said depth map element;
determining said minimum depth of said closest point in function of said intersections.

10. The graphics processing device according to claim 9, wherein the vertices of said at least one surface element being expressed in the space of said depth map, said at least one processor is configured for determining said minimum depth:
if two intersection points are found between said closest edge and the sides of said depth map element, by selecting a smaller depth of said intersection points;
if one intersection point is found between said closest edge and the sides of said depth map element, by selecting a smaller depth of the vertex of said closest edge inside said depth map element and of said one intersection point;
if no intersection is found between said closest edge and the sides of said depth map element, by performing intersections between other edges of said at least one surface element than the closest edge and the sides of said depth map element.

11. The graphics processing device according to claim 10, wherein said at least one processor is configured for determining said minimum depth if no intersection is found between said closest edge and the sides of said depth map element:
if one intersection point is found between each of said other edges and respective adjacent sides of said depth map element pointed by said gradient, by using the depth at the corner between said adjacent sides;
otherwise, if two intersection points are found between said other edges and the sides of said depth map element, by selecting a smallest depth of said intersection points and the vertex of said surface element inside said depth map element, and if four intersection points are found between said other edges and the sides of said depth map element, by selecting the smallest depth of said intersection points;
if no intersection is found between said other edges and the sides of said depth map element, by using the depth at the side of said depth map element having the minimum depth.

12. A method for graphics processing adapted to compute shadow in a three-dimensional scene lighted by at least one light source, based on a plurality of depth maps, one depth map of said plurality of depth maps comprising a plurality of elements, said depth map being associated with a two-dimensional bounded space adapted to render an image of the scene according to a point of view of said light source, said graphics processing method comprising the following acts implemented for a depth map of said plurality of depth maps:
  storing information representative of a depth consisting of a distance between said point of view and a closest visible surface from said point of view for each of depth map elements;
  storing in each element of at least one part of said depth map, coordinates of vertices of at least one surface element of a closest visible surface, the coordinates being expressed in said two-dimensional bounded space of said depth map;
  storing in each element of said at least one part of said depth map, information representative of local depth variation of each of said surface elements in said two-dimensional bounded space of said depth map;
  for a pixel of a plurality of pixels of said image, testing ray intersection in said part of said depth map, with said at least one surface element having depth computed for said pixel from said information representative of depth and of local depth variation, taking into account said coordinates of vertices;
  computing one minimum depth associated with said at least one surface element for each element of said at least one part of said depth map, said minimum depth being computed from said coordinates of vertices and said information representative of depth and of local depth variation;
  comparing depth associated with said pixel of said image, located in said depth map element, with said minimum depth associated with said depth map element and with said at least one surface element;
  classifying said pixel as lit if the depth associated with said pixel is lower than said minimum depth;
  classifying said pixel as shadowed if the depth associated with said pixel is greater than said minimum depth, and if a ray intersection is found for said pixel with said at least one surface element from said ray intersection testing.

13. The method according to claim 12, further comprising classifying said pixel as uncertain if said pixel is not classified as lit and is not classified as shadowed, and tracing a ray having as origin a scene fragment of the three-dimensional scene corresponding to said pixel toward said point of view to determine whether said pixel is lit.

14. The method according to claim 13, wherein said ray is traced only up to a distance to said point of view corresponding to said minimum depth associated with said depth map element in which said pixel is located.

15. The method according to claim 12, wherein said depth map element in which said pixel is located having neighbor depth map elements belonging to said at least one part of said depth map, the method further comprising computing said minimum depth for said depth map element also from said coordinates of vertices and said information representative of depth and of local depth variation stored in said neighbor depth map elements for said at least one surface element associated with said neighbor depth map elements.

16. The method according to claim 15, wherein if a depth associated with said pixel is greater than said minimum depth for said depth map element and if said pixel is not classified as lit and is not classified as shadowed, the method further comprises:
  additionally testing ray intersection for said pixel with at least one other surface element, associated with said neighbor depth map elements, having depth computed in said depth map element from said information representative of depth and of local depth variation stored in said neighbor depth map elements, taking into account said coordinates of vertices stored in said neighbor depth map elements;
  classifying said pixel as shadowed if a ray intersection is found for said pixel with said at least one other surface element from said additional ray intersection testing.

17. The method according to claim 15, wherein for said depth map element, said neighbor depth map elements consist of eight neighbor depth map elements surrounding said depth map element.

18. The method according to claim 12, wherein each of depth map elements having a center, the method further comprises:
  proceeding with a preliminary expansion of each of said at least one surface element to one respectively expanded surface element in determining said depth map elements associated with said surface element;
  determining for each of said depth map elements, expanded surface element covering the center of said depth map element;
  selecting among said expanded surface element covering the center of said depth map element, said expanded surface element, among said at least one expanded surface elements, having a smallest depth at said center;
  for said depth map element belonging to said part of said depth map, storing said coordinates of vertices and said information representative of depth and of local depth variation associated with a selected surface element into said depth map element.

19. The method according to claim 12, further comprising computing said minimum depth at at least one point of said depth map element and of the projection in said two-dimensional bounded space of said depth map of said at least one surface element, called a closest point, said closest point being determined by means of a gradient of decreasing depth variation in the space of said depth map for said surface element, given by said information representative of local depth variation.

20. The method according to claim 19, wherein said depth map element having sides and corners in said space of said depth map and said at least one surface element having edges expressed in said space of said depth map, said closest point is determined by:
  identifying by means of said gradient, among the edges of said at least one surface element, a closest edge having a smallest depth;
  performing intersections between said closest edge and the sides of said depth map element;
  determining said minimum depth of said closest point in function of said intersections.

21. The method according to claim 20, wherein the vertices of said at least one surface element being expressed in the space of said depth map, the method further comprising determining said minimum depth:
  if two intersection points are found between said closest edge and the sides of said depth map element, by selecting a smaller depth of said intersection points;
  if one intersection point is found between said closest edge and the sides of said depth map element, by selecting a smaller depth of the vertex of said closest edge inside said depth map element and of said one intersection point;
  if no intersection is found between said closest edge and the sides of said depth map element, by performing intersections between other edges of said at least one surface element than the closest edge and the sides of said depth map element.

22. The method according to claim 21, further comprising determining said minimum depth if no intersection is found between said closest edge and the sides of said depth map element:
- if one intersection point is found between each of said other edges and respective adjacent sides of said depth map element pointed by said gradient, by using the depth at the corner between said adjacent sides;
- otherwise, if two intersection points are found between said other edges and the sides of said depth map element, by selecting a smallest depth of said intersection points and the vertex of said surface element inside said depth map element, and if four intersection points are found between said other edges and the sides of said depth map element, by selecting the smallest depth of said intersection points;
- if no intersection is found between said other edges and the sides of said depth map element, by using the depth at the side of said depth map element having the minimum depth.

23. A non-transitory processor readable medium having stored therein instructions for causing a processor to perform at least the acts of a method for graphics processing adapted to compute shadow in a three-dimensional scene lighted by at least one light source, based on a plurality of depth maps, one depth map of said plurality of depth maps comprising a plurality of elements, said depth map being associated with a two-dimensional bounded space adapted to render an image of the scene according to a point of view of said light source, said graphics processing method comprising the following acts implemented for a depth map of said plurality of depth maps:
- storing information representative of a depth consisting of a distance between said point of view and a closest visible surface from said point of view for each of depth map elements;
- storing in each element of at least one part of said depth map, coordinates of vertices of at least one surface element of a closest visible surface, the coordinates being expressed in said two-dimensional bounded space of said depth map;
- storing in each element of said at least one part of said depth map, information representative of local depth variation of each of said surface elements in said two-dimensional bounded space of said depth map;
- for a pixel of a plurality of pixels of said image, testing ray intersection in said part of said depth map, with said at least one surface element having depth computed for said pixel from said information representative of depth and of local depth variation, taking into account said coordinates of vertices;
- computing one minimum depth associated with said at least one surface element for each element of said at least one part of said depth map, said minimum depth being computed from said coordinates of vertices and said information representative of depth and of local depth variation;
- comparing depth associated with said pixel of said image, located in said depth map element, with said minimum depth associated with said depth map element and with said at least one surface element;
- classifying said pixel as lit if the depth associated with said pixel is lower than said minimum depth;
- classifying said pixel as shadowed if the depth associated with said pixel is greater than said minimum depth, and if a ray intersection is found for said pixel with said at least one surface element from said ray intersection testing.

* * * * *